(12) United States Patent
Li et al.

(10) Patent No.: US 10,333,682 B2
(45) Date of Patent: Jun. 25, 2019

(54) DATA TRANSMISSION METHOD, DATA TRANSMISSION SYSTEM, CONTROL METHOD, CONTROL SYSTEM, AND DEVICE

(71) Applicant: Yulong Computer Telecommunication Scientific (Shenzhen) Co., Ltd., Shenzhen, Guangdong (CN)

(72) Inventors: Mingju Li, Guangdong (CN); Yajun Zhu, Guangdong (CN); Yunfei Zhang, Guangdong (CN)

(73) Assignee: Nanchang Coolpad Intelligent Technology Company Limited, Nanchang, Jiangxi (CN)

( * ) Notice: Subject to any disclaimer, the term of this patent is extended or adjusted under 35 U.S.C. 154(b) by 109 days.

(21) Appl. No.: 15/589,525

(22) Filed: May 8, 2017

(65) Prior Publication Data

US 2017/0244536 A1 Aug. 24, 2017

Related U.S. Application Data

(63) Continuation of application No. PCT/CN2014/092238, filed on Nov. 26, 2014.

(51) Int. Cl.
*H04L 5/00* (2006.01)
*H04W 72/00* (2009.01)
(Continued)

(52) U.S. Cl.
CPC ......... *H04L 5/0062* (2013.01); *H04B 7/2656* (2013.01); *H04L 5/1469* (2013.01);
(Continued)

(58) Field of Classification Search
None
See application file for complete search history.

(56) References Cited

U.S. PATENT DOCUMENTS

2009/0067448 A1 3/2009 Stanwood et al.
2013/0051383 A1 2/2013 Hakola et al.
(Continued)

FOREIGN PATENT DOCUMENTS

CN 103580840 A 2/2014
EP 3139678 A 3/2017
(Continued)

OTHER PUBLICATIONS

Qualcomm Incorporated, "Extending LTE Advanced to unlicensed spectrum", https://www.qualcomm.com/documents/white-paper-extending-lte-advanced-unlicensed-spectrum, Dec. 31, 2013, 12 pgs.
(Continued)

*Primary Examiner* — Charles C Jiang
*Assistant Examiner* — Saad Khawar
(74) *Attorney, Agent, or Firm* — Young Basile Hanlon & MacFarlane, P.C.

(57) ABSTRACT

A method of configuring a channel detection sub-frame for a terminal and a device with a base station function that includes setting, in a frame structure in a time division duplex mode, a downlink channel detection sub-frame used for periodically detecting whether a downlink channel of an unlicensed frequency band is idle and sending an uplink channel detection sub-frame configuration command to a terminal according to a configuration mode of the downlink channel detection sub-frame. According to the uplink channel detection sub-frame configuration command, an uplink channel detection sub-frame is set for periodically detecting whether an uplink channel of the unlicensed frequency band is idle. The uplink channel detection sub-frame is located in the same sub-frame as a downlink channel detection sub-frame.

15 Claims, 9 Drawing Sheets

(51) Int. Cl.
    *H04B 7/26*     (2006.01)
    *H04L 5/14*     (2006.01)
    *H04W 72/04*     (2009.01)
    *H04W 74/08*     (2009.01)
    *H04W 88/06*     (2009.01)

(52) U.S. Cl.
    CPC ....... *H04W 72/00* (2013.01); *H04W 72/0446* (2013.01); *H04W 74/0816* (2013.01); *H04W 72/0453* (2013.01); *H04W 88/06* (2013.01)

(56) References Cited

U.S. PATENT DOCUMENTS

| | | | |
|---|---|---|---|
| 2013/0208587 A1 | 8/2013 | Bala et al. | |
| 2017/0094681 A1* | 3/2017 | Takeda | H04W 16/14 |
| 2017/0265225 A1* | 9/2017 | Takeda | H04W 16/14 |
| 2017/0280448 A1* | 9/2017 | Takeda | H04W 16/14 |

FOREIGN PATENT DOCUMENTS

| | | |
|---|---|---|
| EP | 3145264 A | 3/2017 |
| EP | 3200545 A | 8/2017 |
| WO | 2014168226 A1 | 10/2014 |
| WO | 2016049915 A | 4/2016 |

OTHER PUBLICATIONS

Wei et al., "A method of rapid transmission on ISM band for LTE system", Journal of Anhui University (Natural Science Edition), vol. 37, No. 2, Mar. 31, 2013, pp. 75-80. (English Abstract).

Qualcomm Technologies, Inc., "Qualcomm Research LTE in Unlicensed Spectrum: Harmonious Coexistence with Wi-Fi", https://www.qualcomm.com/documents/lte-unlicensed-coexitence-whitepaper, Jun. 30, 2014, 19 pgs.

European Extended Search Report dated Apr. 20, 2018 in corresponding EP Application No. 14907020.3.

* cited by examiner

DATA TRANSMISSION METHOD, DATA TRANSMISSION SYSTEM, CONTROL METHOD, CONTROL SYSTEM, AND DEVICE

CROSS-REFERENCE TO RELATED APPLICATION(S)

This application is a continuation of International Application No. PCT/CN2014/092238, filed on Nov. 26, 2014, the content of which is herein incorporated by reference in its entirety.

TECHNICAL FIELD

The present disclosure relates to the field of communication technology, and particularly to a data transmission method for a LTE (Long Term Evolution) system operating in a time division duplex mode in an unlicensed frequency band, a data transmission system for a LTE system operating in a time division duplex mode in an unlicensed frequency band, a control method for configuring a channel detection sub-frame, a control system for configuring a channel detection sub-frame, and a device with base station function.

BACKGROUND

With the rapid increase in communications traffic, authorized spectrums of the 3rd Generation Partner Project (3GPP) are increasingly insufficient to provide higher network capacity, such as an LTE network. In order to further improve the utilization of spectrum resources, 3GPP is discussing how to use unauthorized spectrums such as 2.4 GHz and 5 GHz band with the help of authorized spectrums. The unauthorized spectrum is currently mainly used for Wi-Fi, Bluetooth, radar, medical systems, and the like.

However, in the LTE network, the interference level is ensured by good orthogonality, and uplink/downlink transmission between a base station and a user does not have to consider whether there are other base stations or other users in the transmission of data. If the LTE operates in the unlicensed frequency band without considering whether there are other devices using the unlicensed frequency band, it will bring great interference to Wi-Fi devices. In LTE system, transmission will be performed as long as there is a service and there is no monitoring rules, therefore, a Wi-Fi device cannot perform transmission if the LTE system has service to transmit, and data can only be transmitted by the Wi-Fi device when it is detected that channel is idle after the service transmission of the LTE system is finished.

Therefore, how to prevent a LTE system operating in an unlicensed frequency band from causing great interference to other systems while ensuring normal operation of the LTE system in the unlicensed frequency band has become a technical problem to be solved urgently.

SUMMARY

Based on the above-mentioned problems, the present disclosure provides a new technical scheme, specifically, a new data transmission scheme for a LTE system operating in a time division duplex mode in an unlicensed frequency band is proposed. By mean of the technical scheme of the present disclosure, a LTE system operating in the unlicensed frequency band can be prevented from causing great interference to other systems while ensuring normal operation of the LTE system in the unlicensed frequency band, so that peaceful coexistence of the LTE system and other systems in the unlicensed frequency band is achieved.

In view of this, according to one aspect of the present disclosure, there is provided a data transmission method for a LTE system using TDD (Time Division Duplex) mode in an unlicensed frequency band, the method is applicable to a terminal, and includes the follows. An uplink channel detection sub-frame configuration command from a device with base station function is received; an uplink channel detection sub-frame for periodically detecting whether an uplink channel of the unlicensed frequency band is idle is set in a frame structure of the TDD mode according to the uplink channel detection sub-frame configuration command; in any detection period, if the uplink channel detection sub-frame detects that the uplink channel is idle, uplink data is sent via an uplink sub-frame in the any detection period of the frame structure.

In the technical scheme, by setting, according to the uplink channel detection sub-frame configuration command received, an uplink channel detection sub-frame in a frame structure of the TDD mode so as to detect the status of an uplink channel; in this way, uplink data can be sent via an uplink sub-frame in the frame structure if the uplink channel detection sub-frame detects that the uplink channel is idle, on the other hand, if it is detected that the uplink channel is busy, no uplink data will be sent; therefore, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. "Data" includes normal interaction data and control signaling. "Device with base station function" includes base stations, microcell base stations implemented via a communication device such as a smart phone.

In the above technical scheme, the implemented by a communication device includes: the setting location of the uplink channel detection sub-frame in the frame structure and the number of symbols occupied by the uplink channel detection sub-frame.

In the technical scheme, by setting the location of the uplink channel detection sub-frame in the frame structure and the number of symbols occupied according to the uplink channel detection sub-frame configuration command, it is possible to ensure that the uplink channel is effectively detected, so as to ensure that the uplink data is sent through the uplink sub-frame in the frame structure only when the uplink channel is idle, so as to avoid producing greater interference to other systems with an interference avoidance mechanism.

According to another aspect of the present disclosure, there is provided a data transmission system for a LTE system operating in a TDD mode in an unlicensed frequency band. The data transmission system includes: a receiving unit, configured to receive an uplink channel detection sub-frame configuration command from a device with base station function; a setting unit, configured to set according to the uplink channel detection sub-frame configuration command, in a frame structure of the TDD mode, an uplink channel detection sub-frame for periodically detecting whether an uplink channel of the unlicensed frequency band is idle; a sending unit, configured to send uplink data via an uplink sub-frame in any detection period of the frame structure if the uplink channel detection sub-frame detects that the uplink channel is idle in the any detection period.

In the technical scheme, by setting, according to the uplink channel detection sub-frame configuration command received, an uplink channel detection sub-frame in a frame structure of the TDD mode so as to detect the status of an uplink channel; in this way, uplink data can be sent via an uplink sub-frame in the frame structure if the uplink channel detection sub-frame detects that the uplink channel is idle, on the other hand, if it is detected that the uplink channel is busy, no uplink data will be sent; therefore, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. "Data" includes normal interaction data and control signaling. "Device with base station function" includes base stations, microcell base stations implemented via a communication device such as a smart phone.

In the above technical scheme, the uplink channel detection sub-frame configuration command includes: the setting location of the uplink channel detection sub-frame in the frame structure and the number of symbols occupied by the uplink channel detection sub-frame.

In the technical scheme, by setting the location of the uplink channel detection sub-frame in the frame structure and the number of symbols occupied according to the uplink channel detection sub-frame configuration command, it is possible to ensure that the uplink channel is effectively detected, so as to ensure that the uplink data is sent through the uplink sub-frame in the frame structure only when the uplink channel is idle, so as to avoid producing greater interference to other systems with an interference avoidance mechanism.

According to a further aspect of the present disclosure, there is provided a control method for configuring a channel detection sub-frame, the control method includes: a downlink channel detection sub-frame for periodically detect whether a downlink channel of an unlicensed frequency band is idle is set in a frame structure of a TDD mode; an uplink channel detection sub-frame configuration command is sent to the terminal according to the configuration mode of the downlink channel detection sub-frame, whereby the terminal can set according to the uplink channel detection sub-frame configuration command, in the frame structure, an uplink channel detection sub-frame for periodically detecting whether an uplink channel of the unlicensed frequency band is idle.

In this technical scheme, by setting, in the frame structure, the downlink channel detection sub-frame for periodically detecting whether the downlink channel of the unlicensed frequency band is idle, when it is detected by a device with base station function via the downlink channel detection sub-frame that the downlink channel is idle, the device with base station function can send data via the downlink sub-frame, and no data will be sent if it is detected that the downlink channel is busy; by sending the uplink channel detection sub-frame configuration command to the terminal, the terminal can set, in the frame structure of the TDD mode, according to the uplink channel detection sub-frame configuration command, the uplink channel detection sub-frame to detect the state of the uplink channel, so as to send uplink data via the uplink sub-frame of the frame structure if the uplink channel detection sub-frame detects that the uplink channel is idle, and no uplink data will be sent if it is detected that the uplink channel is busy. Therefore, by means of technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. "Data" includes normal interaction data and control signaling. "Device with base station function" includes base stations, microcell base stations implemented via a communication device such as a smart phone.

In the above mentioned technical scheme, the downlink channel detection sub-frame is set in at least one sub-frame of the frame structure, and the uplink channel detection sub-frame contained in the uplink channel detection sub-frame configuration command is located in the same sub-frame as the downlink channel detection sub-frame.

In this technical scheme, by arranging the uplink channel detection sub-frame in at least one sub-frame of the frame structure of the TDD mode and in the same sub-frame as the downlink channel detection sub-frame, in the frame structure of the TDD mode, there is no need to provide another sub-frame to carry a channel detection sub-frame, and it is possible to avoid that the uplink/downlink channel detection sub-frame occupies too many sub-frames; besides, the uplink/downlink channel detection sub-frame can be provided in one or more sub-frames of the frame structure of the TDD mode according to the actual situation of the LTE system, and the setting location of the uplink/downlink channel detection sub-frame can be one or more locations in an uplink sub-frame, a downlink sub-frame, or a special sub-frame.

The following lists several settings modes of the uplink/downlink channel detection sub-frame.

Setting Mode 1

In the above-mentioned technical scheme, the downlink channel detection sub-frame is set at the front end of a downlink sub-frame adjacent to an uplink sub-frame and a special sub-frame, and the setting location of the uplink channel detection sub-frame contained in the uplink channel detection sub-frame configuration command is at the rear end of the downlink channel.

In this technical scheme, by setting the downlink channel detection sub-frame at the front end of the downlink sub-frame adjacent to the uplink sub-frame and the special sub-frame and setting the uplink channel detection sub-frame to be located at the rear end of the downlink sub-frame, it is possible to achieve the detection of an uplink (downlink) channel before uplink (downlink) transmission of the uplink (downlink) sub-frame, and then it is possible to determine whether data can be sent via the uplink (downlink) sub-frame; the timeliness of channel detection can be ensured; it can also ensure that the channel state detected before uplink (downlink) data transmission is the latest state; it is possible to avoid that the uplink (downlink) data transmission being affected by a already changed channel state when it is needed to send uplink (downlink) data, where change of the channel state is caused by earlier channel detection and later uplink (downlink) data transmission; meanwhile, since the uplink (downlink) channel detection sub-frame does not occupy the uplink sub-frame, therefore, it is possible to ensure that the uplink sub-frame is completely used for uplink data transmission and to realize the full utilization of the uplink sub-frame; besides, a guard period needs to be set when a downlink sub-frame is converted to an uplink sub-frame, and when detecting the uplink channel, the uplink channel detection sub-frame is equivalent to a downlink signal, therefore, by setting the uplink channel detection sub-frame at the rear end of the downlink channel detection sub-frame, it is possible to avoid setting an additional guard period within the downlink sub-frame, and it is also possible to ensure that the remaining time between the downlink channel detection sub-frame and the uplink channel detection sub-frame can still be used to send downlink data.

In the above-mentioned technical scheme, if the downlink channel detection sub-frame occupies a first number of symbols and the uplink channel detection sub-frame contained in the uplink channel detection sub-frame configuration command occupies a second number of symbols, the sum of the first number and the second number is in the range of 2 to 14.

In this technical scheme, since each sub-frame of each frame structure has 14 symbols, and each uplink (downlink) channel detection sub-frame occupies at least one symbol respectively, therefore, the number of symbols occupied by the uplink (downlink) channel detection sub-frame is in the range of 2 to 14.

Setting Mode 2

In the above-mentioned technical scheme, the downlink channel detection sub-frame is set in a target downlink sub-frame that is immediately adjacent to other downlink sub-frames and a special sub-frame, and a guard period is set at the front end of the target downlink sub-frame, such that the downlink channel detection sub-frame is immediately adjacent to the guard period, and the setting location of the uplink channel detection sub-frame contained in the uplink channel detection sub-frame configuration command is at the rear end of the target downlink sub-frame.

In this technical scheme, a guard period needs to be set when the downlink sub-frame is converted to an uplink sub-frame, and when detecting the downlink channel, the downlink channel detection sub-frame is equivalent to an uplink signal, therefore, if the downlink channel detection sub-frame is set at the front end of the downlink sub-frame, a guard period will need to be set at the most front end of the downlink sub-frame; by setting the downlink channel detection sub-frame in the target downlink sub-frame immediately adjacent to the other downlink sub-frames and the special sub-frame, and setting the uplink channel detection sub-frame at the rear end of the target downlink sub-frame, it is possible to achieve the detection of an uplink (downlink) channel before uplink (downlink) transmission of the uplink (downlink) sub-frame, and then it is possible to determine whether data transmission can be performed via the uplink (downlink) sub-frame; the timeliness of channel detection can be ensured; it can also ensure that the channel state detected before uplink (downlink) data transmission is the latest state; it is possible to avoid that the uplink (downlink) data transmission being affected by a already changed channel state when it is needed to send uplink (downlink) data, where change of the channel state is caused by earlier channel detection and later uplink (downlink) data transmission; meanwhile, since the uplink (downlink) channel detection sub-frame does not occupy the uplink sub-frame, therefore, it is possible to ensure that the uplink sub-frame is completely used for uplink data transmission and to realize the full utilization of the uplink sub-frame.

In the above-mentioned technical scheme, if the downlink channel detection sub-frame occupies a third number of symbols and the uplink channel detection sub-frame contained in the uplink channel detection sub-frame configuration command occupies a fourth number of symbols, the sum of the third number and the fourth number is in the range of 2 to 13.

In this technical scheme, since each sub-frame of each frame structure has 14 symbols, each uplink (downlink) channel detection sub-frame occupies at least one symbol respectively, and the guard period occupies at least one symbol, therefore, the sum of the number of symbols occupied by the uplink (downlink) channel detection sub-frame is in the range of 2 to 14.

Setting Mode 3

In the above-mentioned technical scheme, the downlink channel detection sub-frame is set in an uplink sub-frame adjacent to a downlink sub-frame, and the setting location of the uplink channel detection sub-frame contained in the uplink channel detection sub-frame configuration command is at the rear end of the uplink sub-frame, so as to immediately adjacent to the downlink channel detection sub-frame.

In this technical scheme, by setting the downlink channel detection sub-frame to be in the uplink sub-frame adjacent to the downlink sub-frame and setting the uplink channel detection sub-frame to be at the rear end of the uplink sub-frame, it is possible to perform measurements on the uplink (downlink) channel in time when uplink (downlink) transmission is required, and it is possible to avoid setting an additional guard period; meanwhile, since the uplink (downlink) channel detection sub-frame does not occupy any downlink sub-frame, it is possible to ensure that the downlink sub-frame is completely used for downlink data transmission, and the utilization of the downlink sub-frame is realized.

In the above-mentioned technical scheme, if the downlink channel detection sub-frame occupies a fifth number of symbols and the uplink channel detection sub-frame contained in the uplink channel detection sub-frame configuration command occupies a sixth number of symbols, the sum of the fifth number and the sixth number is in the range of 2 to 14.

Setting Mode 4

In the above-mentioned technical scheme, the downlink channel detection sub-frame is set in the special sub-frame and immediately adjacent to an uplink pilot time slot, and the setting location of the uplink channel detection sub-frame contained in the uplink channel detection sub-frame configuration command is a location immediately adjacent to a downlink pilot time slot.

In this technical scheme, by setting the downlink channel detection sub-frame in the special sub-frame, setting the downlink channel detection sub-frame to immediately adjacent to the uplink pilot time slot, and setting the uplink channel detection sub-frame to immediately adjacent to the downlink pilot time slot, so that there is no need to occupy the downlink sub-frame and the uplink sub-frame, and there is no need to set an additional protection time, and thus can ensure that the uplink transmission and downlink transmission of the system is not affected; meanwhile, if different base stations of the same operator set the channel detection sub-frame on the special sub-frame on the same carrier frequency as well as at the same location of the frame structure, then in the measurement of channel state, different base stations are based on a base station of other operators as a reference, and will not judge that the channel is busy even if a base station signal of the same operator is detected.

In the above-mentioned technical scheme, if the downlink channel detection sub-frame occupies a seventh number of symbols and the uplink channel detection sub-frame contained in the uplink channel detection sub-frame configuration command occupies an eighth number of symbols, the sum of the seventh number and the eighth number is in the range of 2 to 9.

In this technical scheme, since each sub-frame of each frame structure has 14 symbols, and each uplink (downlink) channel detection sub-frame occupies at least one symbol respectively, the uplink pilot time slot occupies at least one symbol, the downlink pilot time slot occupies at least three symbols, and the guard period occupies at least one symbol, therefore, the number of symbols occupied by the uplink (downlink) channel detection sub-frame is in the range of 2 to 9.

In the above mentioned technical scheme, in the operation of the LTE system, the number of symbols occupied by the uplink channel detection sub-frame and the downlink channel detection sub-frame is fixed; or in the operation of the LTE system, the rate of change of the channel condition of other systems using the unlicensed frequency band around the LTE system is detected in real time, and the number of symbols occupied by the downlink channel detection sub-frame and/or the number of symbols occupied by the uplink channel detection sub-frame is set dynamically according to the rate of change of the channel condition of the other systems detected in real time and the channel detection capability of the device with base station function and/or the terminal.

In this technical scheme, in order to judge whether the uplink (downlink) channel is busy timely and accurately, the number of symbols occupied by the uplink (downlink) channel detection sub-frame can be fixed or can be dynamically changed, that is, the device with base station function can dynamically set the number of symbols occupied by the channel detection sub-frame according to the rate of change of the channel condition of the other systems and the channel detection capacity of the device with base station function and/or the terminal, whereby the device with base station function and/or the terminal can judge whether the uplink (downlink) channel is busy fully and accurately according to the uplink (downlink) channel detection sub-frame, and send uplink (downlink) data in time if it is detected that the uplink (downlink) channel is idle.

In the above-mentioned technical scheme, the rate of change of the channel condition of the other systems is proportional to the number of symbols occupied by the downlink channel detection sub-frame and the uplink channel detection sub-frame; the channel detection capacity of the device with base station function and the channel detection capacity of the terminal is inversely proportional to the number of symbols occupied by the downlink channel detection sub-frame and the number of symbols occupied by the uplink channel detection sub-frame respectively.

In this technical scheme, when dynamically adjust the number of symbols occupied by the uplink (downlink) channel detection sub-frame according to the actual situation, in order to be able to accurately measure the state of the uplink (downlink) channel, if the channel conditions of the other systems around the LTE system using the unlicensed band are changed faster, it is necessary to measure the state of the uplink (downlink) channel for several times, that is, the number of symbols occupied by the uplink (downlink) channel detection sub-frame is set to be large; if the channel detection capacity of the terminal is poor, it is also necessary to measure the state of the uplink channel for several times, that is, the number of symbols occupied by the uplink channel detection sub-frame is set to be large; similarly, if the channel detection capacity of the device with base station function is poor, it is also necessary to measure the state of the downlink channel for several times, that is, the number of symbols occupied by the downlink channel detection sub-frame is set to be large. Therefore, the rate of change of the channel condition of the other systems is proportional to the number of symbols occupied by the uplink (downlink) channel detection sub-frame, the channel detection capacity of the terminal is inversely proportional to the number of symbols occupied by the uplink channel detection sub-frame, and the channel detection capacity of the device with base station function is inversely proportional to the number of symbols occupied by the downlink channel detection sub-frame.

According to a further aspect of the present disclosure, there is provided a control system for configuring a channel detection sub-frame, the control system includes: a setting unit, configured to set, in a frame structure of a TDD mode, a downlink channel detection sub-frame for periodically detecting whether a downlink channel of an unlicensed frequency band is idle; a sending unit, configured to send an uplink channel detection sub-frame configuration command to the terminal according to the configuration mode of the downlink channel detection sub-frame, whereby the terminal can set according to the uplink channel detection sub-frame configuration command, in the frame structure, an uplink channel detection sub-frame for periodically detecting whether an uplink channel of the unlicensed frequency band is idle.

In this technical scheme, by setting in the frame structure the downlink channel detection sub-frame for periodically detecting whether the downlink channel of the unlicensed frequency band is idle, when it is detected by a device with base station via the downlink channel detection sub-frame that the downlink channel is idle, the device with base station function can send downlink data via the downlink sub-frame, and no downlink data will be sent if it is detected that the downlink channel is busy; by sending the uplink channel detection sub-frame configuration command to the terminal, the terminal can set in the frame structure of the TDD mode, according to the uplink channel detection sub-frame configuration command, the uplink channel detection sub-frame to detect the state of the uplink channel, so as to send uplink data via the uplink sub-frame of the frame structure if the uplink channel detection sub-frame detects that the uplink channel is idle, and no uplink data will be sent if it is detected that the uplink channel is busy. Therefore, by means of technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. "Data" includes normal interaction data and control signaling. "Device with base station function" includes base stations, microcell base stations implemented via a communication device such as a smart phone.

In the above-mentioned technical scheme, the setting unit is further configured to set the downlink channel detection sub-frame in at least one sub-frame of the frame structure, and the uplink channel detection sub-frame contained in the uplink channel detection sub-frame configuration command is set to be located in the same sub-frame as the downlink channel detection sub-frame.

In this technical scheme, by arranging the uplink channel detection sub-frame in at least one sub-frame of the frame structure of the TDD mode and in the same sub-frame as the downlink channel detection sub-frame, in the frame structure of the TDD mode, there is no need to provide another sub-frame to carry a channel detection sub-frame, and it is possible to avoid that the uplink/downlink channel detection sub-frame occupies too many sub-frames; besides, the uplink/downlink channel detection sub-frame can be set in one or more sub-frames of the frame structure of the TDD mode according to the actual situation of the LTE system, and the setting location of the uplink/downlink channel detection sub-frame can be one or more locations in an uplink sub-frame, a downlink sub-frame, or a special sub-frame.

The following lists several settings modes of the uplink/downlink channel detection sub-frame.

Setting Mode 1

In the above-mentioned technical scheme, the setting unit is further configured to: set the downlink channel detection sub-frame to be at the front end of a downlink sub-frame adjacent to an uplink sub-frame and a special sub-frame, and set the setting location of the uplink channel detection sub-frame contained in the uplink channel detection sub-frame configuration command to be at the rear end of the downlink channel.

In this technical scheme, by setting the downlink channel detection sub-frame to be at the front end of the downlink sub-frame adjacent to the uplink sub-frame and the special sub-frame and setting the uplink channel detection sub-frame to be located at the rear end of the downlink sub-frame, it is possible to achieve the detection of an uplink (downlink) channel before uplink (downlink) transmission of the uplink (downlink) sub-frame, and then it is possible to determine whether data transmission can be performed via the uplink (downlink) sub-frame; the timeliness of channel detection can be ensured; it can also ensure that the channel state detected before uplink (downlink) data transmission is the latest state; it is possible to avoid that the uplink (downlink) data transmission being affected by a already changed channel state when it is needed to send uplink (downlink) data, where change of the channel state is caused by earlier channel detection and later uplink (downlink) data transmission; meanwhile, since the uplink (downlink) channel detection sub-frame does not occupy the uplink sub-frame, therefore, it is possible to ensure that the uplink sub-frame is completely used for uplink data transmission and to realize the full utilization of the uplink sub-frame; besides, a guard period needs to be set when a downlink sub-frame is converted to an uplink sub-frame, and when detecting the uplink channel, the uplink channel detection sub-frame is equivalent to a downlink signal, therefore, by setting the uplink channel detection sub-frame to be at the rear end of the downlink channel detection sub-frame, it is possible to avoid setting an additional guard period within the downlink sub-frame, and it is also possible to ensure that the remaining time between the downlink channel detection sub-frame and the uplink channel detection sub-frame can still be used to send downlink data.

In the above-mentioned technical scheme, if the downlink channel detection sub-frame occupies a first number of symbols and the uplink channel detection sub-frame contained in the uplink channel detection sub-frame configuration command occupies a second number of symbols, the sum of the first number and the second number is in the range of 2 to 14.

In this technical scheme, since each sub-frame of each frame structure has 14 symbols, and each uplink (downlink) channel detection sub-frame occupies at least one symbol respectively, therefore, the sum of the number of symbols occupied by the uplink (downlink) channel detection sub-frame is in the range of 2 to 14.

Setting Mode 2

In the above-mentioned technical scheme, the setting unit is further configured to: set the downlink channel detection sub-frame to be in a target downlink sub-frame that is immediately adjacent to other downlink sub-frames and a special sub-frame, and set a guard period at the front end of the target downlink sub-frame, such that the downlink channel detection sub-frame is immediately adjacent to the guard period, and the setting location of the uplink channel detection sub-frame contained in the uplink channel detection sub-frame configuration command is at the rear end of the target downlink sub-frame.

In this technical scheme, a guard period needs to be set when the downlink sub-frame is converted to an uplink sub-frame, and when detecting the downlink channel, the downlink channel detection sub-frame is equivalent to an uplink signal, therefore, if the downlink channel detection sub-frame is set at the front end of the downlink sub-frame, a guard period will need to be set to be at the most front end of the downlink sub-frame; by setting the downlink channel detection sub-frame in the target downlink sub-frame immediately adjacent to the other downlink sub-frames and the special sub-frame, and setting the uplink channel detection sub-frame to be at the rear end of the target downlink sub-frame, it is possible to achieve the detection of an uplink (downlink) channel before uplink (downlink) transmission of the uplink (downlink) sub-frame, and then it is possible to determine whether data can be sent via the uplink (downlink) sub-frame; the timeliness of channel detection can be ensured; it can also ensure that the channel state detected before uplink (downlink) data transmission is the latest state; it is possible to avoid that the uplink (downlink) data transmission being affected by a already changed channel state when it is needed to send uplink (downlink) data, where change of the channel state is caused by earlier channel detection and later uplink (downlink) data transmission; meanwhile, since the uplink (downlink) channel detection sub-frame does not occupy the uplink sub-frame, and therefore, it is possible to ensure that the uplink sub-frame is completely used for uplink data transmission and to realize the full utilization of the uplink sub-frame.

In the above-mentioned technical scheme, if the downlink channel detection sub-frame occupies a third number of symbols and the uplink channel detection sub-frame contained in the uplink channel detection sub-frame configuration command occupies a fourth number of symbols, the sum of the third number and the fourth number is in the range of 2 to 13.

In this technical scheme, since each sub-frame of each frame structure has 14 symbols, each uplink (downlink) channel detection sub-frame occupies at least one symbol respectively, and the guard period occupies at least one symbol, therefore, the number of symbols occupied by the uplink (downlink) channel detection sub-frame is in the range of 2 to 14.

Setting Mode 3

In the above-mentioned technical scheme, the setting unit is further configured to: set the downlink channel detection sub-frame to be in an uplink sub-frame adjacent to a downlink sub-frame, and the setting location of the uplink channel detection sub-frame contained in the uplink channel detection sub-frame configuration command is at the rear end of the uplink sub-frame, so as to immediately adjacent to the downlink channel detection sub-frame.

In this technical scheme, by setting the downlink channel detection sub-frame to be in the uplink sub-frame adjacent to the downlink sub-frame and setting the uplink channel detection sub-frame to be at the rear end of the uplink sub-frame, it is possible to perform measurements on the uplink (downlink) channel in time when uplink (downlink) transmission is required, and it is possible to avoid setting an additional guard period; meanwhile, since the uplink (downlink) channel detection sub-frame does not occupy any downlink sub-frame, it is possible to ensure that the downlink sub-frame is completely used for downlink data transmission, and the utilization of the downlink sub-frame is realized.

In the above-mentioned technical scheme, if the downlink channel detection sub-frame occupies a fifth number of symbols and the uplink channel detection sub-frame contained in the uplink channel detection sub-frame configuration command occupies a sixth number of symbols, the sum of the fifth number and the sixth number is in the range of 2 to 14.

Setting Mode 4

In the above-mentioned technical scheme, the setting unit is further configured to: set the downlink channel detection sub-frame to be in the special sub-frame and immediately adjacent to an uplink pilot time slot, and the setting location of the uplink channel detection sub-frame contained in the uplink channel detection sub-frame configuration command is a location immediately adjacent to a downlink pilot time slot.

In this technical scheme, by setting the downlink channel detection sub-frame to be in the special sub-frame, setting the downlink channel detection sub-frame to immediately adjacent to the uplink pilot time slot, and setting the uplink channel detection sub-frame to immediately adjacent to the downlink pilot time slot, so that there is no need to occupy the downlink sub-frame and the uplink sub-frame, and there is no need to set an additional protection time, and thus can ensure that the uplink transmission and downlink transmission of the system is not affected; meanwhile, if different base stations of the same operator set the channel detection sub-frame on the special sub-frame on the same carrier frequency as well as at the same location of the frame structure, then when measuring the channel state, different base stations are based on a base station of other operators as a reference, and will not judge that the channel is busy even if a base station signal of the same operator is detected.

In the above-mentioned technical scheme, if the downlink channel detection sub-frame occupies a seventh number of symbols and the uplink channel detection sub-frame contained in the uplink channel detection sub-frame configuration command occupies an eighth number of symbols, the sum of the seventh number and the eighth number is in the range of 2 to 9.

In this technical scheme, since each sub-frame of each frame structure has 14 symbols, and each uplink (downlink) channel detection sub-frame occupies at least one symbol respectively, the uplink pilot time slot occupies at least one symbol, the downlink pilot time slot occupies at least three symbols, and the guard period occupies at least one symbol, therefore, the sum of the number of symbols occupied by the uplink (downlink) channel detection sub-frame is in the range of 2 to 9.

In the above mentioned technical scheme, in the operation of the LTE system, the number of symbols occupied by the uplink channel detection sub-frame and the downlink channel detection sub-frame is fixed; or the setting unit includes: a detecting unit, configured to detect, in the operation of the LET system, the rate of change of the channel condition of the other systems using the unlicensed frequency band around the LTE system in real time; the setting unit is further configured to dynamically set the number of symbols occupied by the downlink channel detection sub-frame and/or the number of symbols occupied by the uplink channel detection sub-frame according to the rate of change of the channel condition of the other system detected in real time and the channel detection capability of the device with base station function and/or the terminal.

In this technical scheme, in order to judge whether the uplink (downlink) channel is busy timely and accurately, the number of symbols occupied by the uplink (downlink) channel detection sub-frame can be fixed or can be dynamically changed, that is, the device with base station function can dynamically set the number of symbols occupied by the channel detection sub-frame according to the rate of change of the channel condition of the other systems and the channel detection capacity of the device with base station function and/or the terminal, whereby the device with base station function and/or the terminal can judge whether the uplink (downlink) channel is busy fully and accurately according to the uplink (downlink) channel detection sub-frame, and send uplink (downlink) data in time if it is detected that the uplink (downlink) channel is idle.

In the above-mentioned technical scheme, the rate of change of the channel condition of the other systems is proportional to the number of symbols occupied by the downlink channel detection sub-frame or the uplink channel detection sub-frame; the channel detection capacity of the device with base station function and the channel detection capacity of the terminal is inversely proportional to the number of symbols occupied by the downlink channel detection sub-frame and the number of symbols occupied by the uplink channel detection sub-frame respectively.

In this technical scheme, when dynamically adjust the number of symbols occupied by the uplink (downlink) channel detection sub-frame according to the actual situation, in order to be able to accurately measure the state of the uplink (downlink) channel, if the channel condition of other systems around the LTE system using the unlicensed band is changed faster, it is necessary to measure the state of the uplink (downlink) channel for several times, that is, the number of symbols occupied by the uplink (downlink) channel detection sub-frame is set to be large; if the channel detection capacity of the terminal is poor, it is also necessary to measure the state of the uplink channel for several times, that is, the number of symbols occupied by the uplink channel detection sub-frame is set to be large. Similarly, if the channel detection capacity of the device with base station function is poor, it is also necessary to measure the state of the downlink channel for several times, that is, the number of symbols occupied by the downlink channel detection sub-frame is set to be large. Therefore, the rate of change of the channel condition of the other systems is proportional to the number of symbols occupied by the uplink (downlink) channel detection sub-frame, the channel detection capacity of the terminal is inversely proportional to the number of symbols occupied by the uplink channel detection sub-frame, and the channel detection capacity of the device with base station function is inversely proportional to the number of symbols occupied by the downlink channel detection sub-frame.

According to a further aspect of the present disclosure, there is provided a data transmission method for a LTE system operating in a time division duplex mode in an unlicensed frequency band, the method includes: a channel detection sub-frame for periodically detecting the state of a downlink channel is set in a frame structure of a TDD mode; in any period, it is detected via the channel detection sub-frame that whether the downlink channel is idle, it is judged that whether to send downlink data in a downlink sub-frame of the any period according to the state detection result of the downlink channel, and the state detection result of the downlink channel is sent to the terminal, whereby the terminal can determine whether to send uplink data in an uplink sub-frame within the any period.

In this technical scheme, by setting in the frame structure the channel detection sub-frame for periodically detecting whether the downlink channel of the unlicensed frequency band is idle, when it is detected by a device with base station function via the channel detection sub-frame that the downlink channel is idle, the device with base station function can send data via the downlink sub-frame, and no data will be sent if it is detected that the downlink channel is busy; by sending the state detection result of the downlink channel to the terminal, the terminal can send uplink data via the uplink sub-frame in the frame structure if the state detection result of the downlink channel is idle, and no uplink data will be sent if the state detection result of the downlink channel is busy. Therefore, by means of technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. Meanwhile, by determining whether to send uplink data according to the state detection result of the downlink channel, it is possible to avoid setting an uplink channel detection sub-frame in the frame structure. "Data" includes normal interaction data and control signaling. "Device with base station function" includes base stations, microcell base stations implemented via a communication device such as a smart phone.

According to a further aspect of the present disclosure, there is provided a data transmission system for a LTE system operating in a time division duplex mode in an unlicensed frequency band; the system includes: a setting unit, configured to set a channel detection sub-frame for periodically detecting the state of a downlink channel in a frame structure of a TDD mode; a sending unit, configured to determine in any period, after the channel detection sub-frame detects whether the downlink channel is idle, whether to send downlink data in a downlink sub-frame of the any period according to a state detection result of the downlink channel, and send the state detection result of the downlink channel to the terminal, whereby the terminal can determine whether to send uplink data on the uplink sub-frame within the any period.

In this technical scheme, by setting in a frame structure a channel detection sub-frame for periodically detecting whether a downlink channel of an unlicensed frequency band is idle, a device with base station function can send downlink data via a downlink sub-frame if it is detected via the channel detection sub-frame that the downlink channel is idle, and no downlink data will be sent if it is detected that the downlink channel is busy; by sending the state detection result of the downlink channel to the terminal, the terminal can send uplink data via an uplink sub-frame of the frame structure if the state detection result for the downlink channel is idle, and no uplink data will be sent if the state detection result of the downlink channel is busy. Therefore, by means of technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. Meanwhile, by determining by the terminal whether to send uplink data according to the state detection result of the downlink channel, it is possible to avoid setting an uplink channel detection sub-frame in the frame structure. "Data" includes normal interaction data and control signaling. "Device with base station function" includes base stations, microcell base stations implemented via a communication device such as a smart phone.

According to a further aspect of the present disclosure, there is provided a device with base station function, the device includes: the control system for configuring a channel detection sub-frame or a data transmission system for a LTE system operating in a TDD mode in an unlicensed frequency band.

In this technical scheme, by providing the device with base station function with the control system for configuring a channel detection sub-frame or the data transmission system for a LTE system operating in a TDD mode in an unlicensed frequency band, a corresponding interference avoidance mechanism can be adopted when the LTE system operates in a TDD mode in an unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band.

According to a further aspect of the present disclosure, there is provided a data transmission method for a LTE system operating in a TDD mode in an unlicensed frequency band; the method includes: a state detection result of a downlink channel sent by a device with base station function is received, and uplink data is sent via an uplink sub-frame in any period in the frame structure if the state detection result is that the downlink channel is idle, otherwise, no uplink data is sent in the any period.

In this technical scheme, by receiving the state detection result of the downlink channel from a base station, the terminal can sent uplink data via the uplink sub-frame in the frame structure if the state detection result of the downlink channel is idle, and no uplink data is sent if the state detection result of the downlink channel is busy; therefore, by means of the technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band; meanwhile, the terminal can determine whether to send uplink data according to the state detection result of the downlink channel, such that it can avoid setting an uplink channel detection sub-frame in the frame structure.

According to another aspect of the present disclosure, there is provided a data transmission system for a LTE system operating in a TDD mode in an unlicensed frequency band, the system includes: a receiving unit, configured to receive a state detection result of a downlink channel sent by a device with base station function; and a sending unit, configured to send uplink data via an uplink sub-frame in any period in the frame structure if the state detection result is that the downlink channel is idle, otherwise, do not send the uplink data in the any period.

In this technical scheme, by receiving the state detection result of the downlink channel from a base station, the terminal can sent uplink data via the uplink sub-frame in the frame structure if the state detection result of the downlink channel is idle, and no uplink data is sent if the state detection result of the downlink channel is busy; therefore, by means of the technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band; meanwhile, the terminal can determine whether to send uplink data according to the state detection result of the downlink channel, such that it can avoid setting an uplink channel detection sub-frame in the frame structure.

By means of the technical scheme of the present disclosure, a LTE system operating in an unlicensed frequency band can be prevented from causing great interference to other systems while ensuring normal operation of the LTE system in the unlicensed frequency band, so that peaceful coexistence of the LTE system and other systems in the unlicensed frequency band is achieved.

BRIEF DESCRIPTION OF THE DRAWINGS

FIG. 14 is a structure diagram illustrating an uplink (downlink) channel detection sub-frame set in an uplink sub-frame according to an implementation of the present disclosure.

FIG. 15 is a structure diagram illustrating an uplink (downlink) channel detection sub-frame set in a special sub-frame according to an implementation of the present disclosure.

DETAILED DESCRIPTION

In order to illustrate the technical solutions of the present disclosure or the related art more clearly, a brief description of the accompanying drawings used herein is given below. Obviously, the drawings listed below are only examples, and a person skilled in the art should be noted that, other drawings can also be obtained on the basis of these exemplary drawings without creative work.

In the following description, numerous specific details are set forth in order to facilitate a thorough understanding of the present disclosure, however, the present disclosure can be practiced otherwise than as specifically described herein, and therefore, the scope of the present disclosure is not to be limited by the specific implementations disclosed below.

Figure 1:
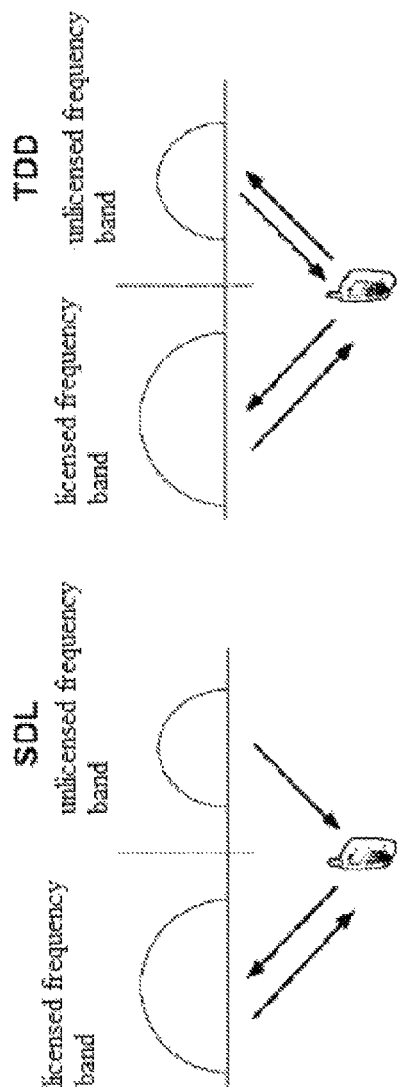
FIG. 1 is a schematic diagram illustrating two modes of operation for an unlicensed frequency band.

In general, access technologies such as Long Term Evolution (LTE) designed for licensed bands are not suitable for use on unlicensed bands, this is because the spectrum efficiency and user experience optimization requirements for access technologies such as LTE is very high. However, the carrier aggregation (CA) function makes it possible to deploy LTE in unlicensed bands. 3GPP proposed the concept of LAA (LTE Assisted Access), which can use the unlicensed spectrum with the help of the LTE licensed spectrum. As shown in FIG. 1, there are two ways in which an unlicensed spectrum works; one is Supplemental Downlink (SDL) mode, in which only downlink transmission sub-frame is included; the other one is TDD mode, in which both uplink sub-frames and downlink sub-frames are included. The supplemental downlink mode can only be used with aid of the carrier aggregation technology. In addition to the carrier aggregation technology, the TDD mode can also be used with aid of Dual Connectivity (DC) technology as well as used independently.

Compared with Wi-Fi technology, a LTE system operating in the unlicensed frequency band has the ability to provide higher spectral efficiency and greater coverage, meanwhile, data traffic can be seamlessly switched between the licensed frequency band and unlicensed band based on the same core network. For users, this means a better broadband experience, higher speed, better stability, and mobile convenience.

Figure 2:
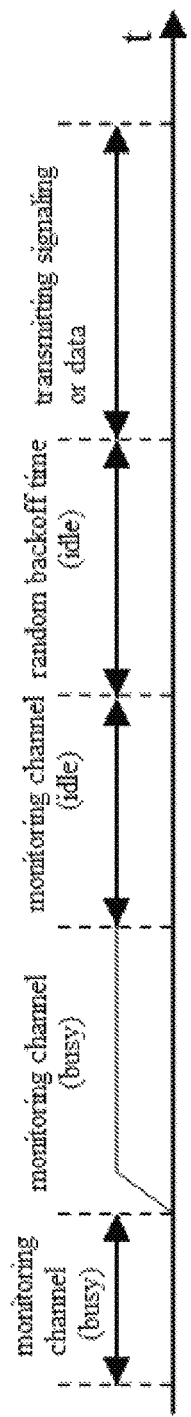
FIG. 2 is a schematic diagram illustrating an interference avoidance mechanism for a Wi-Fi system.

Existing access technologies used on unlicensed spectrums such as Wi-Fi have weaker anti-interference capability; Wi-Fi systems have designed a lot of interference avoidance rules, such as Carrier Sense Multiple Access/Collision Detection (CSMA/CD), the basic principle of this method is that, before sending signaling or data, an access point (AP) of Wi-Fi or terminal has to monitor whether there are other APs or other terminals is sending/receiving signaling or data, and if yes, continue to monitor until there is no AP or terminal sending/receiving signaling or data; otherwise, generate a random number as a backoff time, and if no signaling or data transmission is detected within the backoff time, then after the backoff time, the AP or terminal can start to send signaling or data, the process is illustrated in FIG. 2.

As can be seen, for the LTE network, when using an unlicensed frequency band, one of the key points is to ensure that LAA can coexist with existing access technologies (such as Wi-Fi) on a fair and friendly basis. However, there is no LBT (Listen Before Talk) mechanism in traditional LTE systems to avoid collisions.

Figure 3:
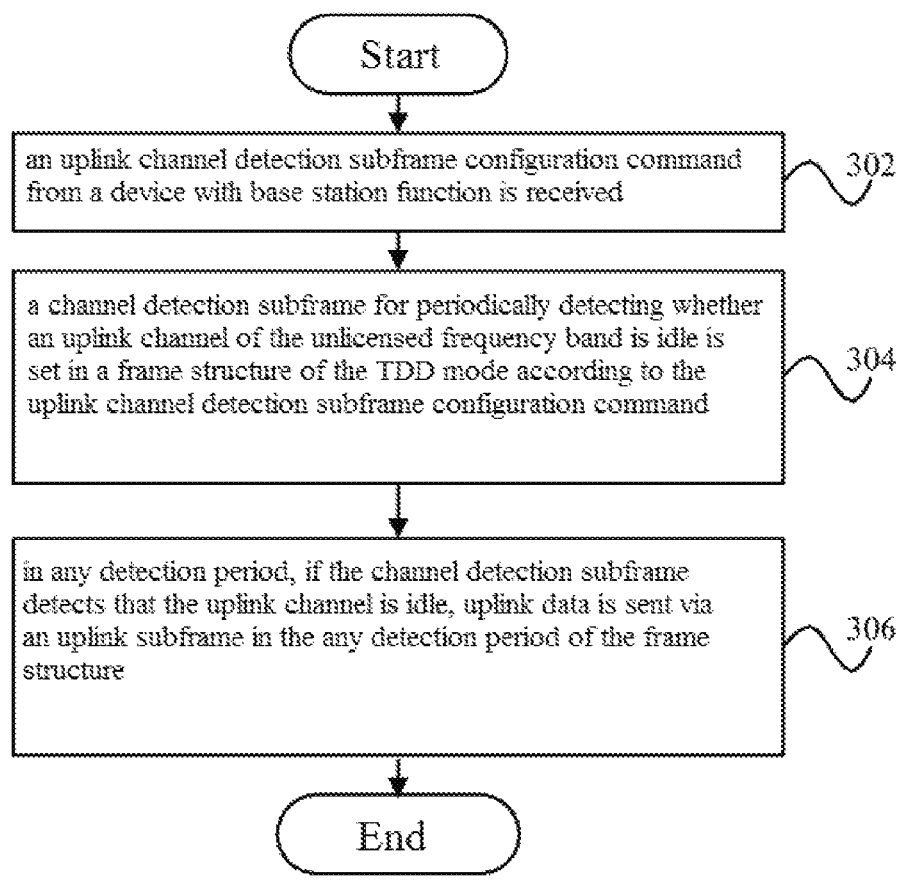
FIG. 3 is a flow chart diagram illustrating a data transmission method of a LTE system operating in a TDD mode in an unlicensed frequency band according to an implementation of the present disclosure.

FIG. 3 is a flow chart diagram illustrating a data transmission method of a LTE system operating in a TDD mode in an unlicensed frequency band according to an implementation of the present disclosure.

As illustrated in FIG. 3, the data transmission method of a LTE system operating in a TDD mode in an unlicensed frequency band according to an implementation of the present disclosure includes the follows. Step 302, an uplink channel detection sub-frame configuration command from a device with base station function is received. Step 304, an uplink channel detection sub-frame for periodically detecting whether an uplink channel of the unlicensed frequency band is idle is set in a frame structure of the TDD mode according to the uplink channel detection sub-frame configuration command. Step 306, in any detection period, if the uplink channel detection sub-frame detects that the uplink channel is idle, uplink data is sent via an uplink sub-frame in the any detection period of the frame structure.

In the technical scheme, by setting, according to the uplink channel detection sub-frame configuration command received, an uplink channel detection sub-frame in a frame structure of the TDD mode so as to detect the status of an uplink channel; in this way, uplink data can be sent via an uplink sub-frame in the frame structure if the uplink channel detection sub-frame detects that the uplink channel is idle, on the other hand, if it is detected that the uplink channel is busy, no uplink data will be sent; therefore, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. "Data" includes normal interaction data and control signaling. "Device with base station function" includes base stations, microcell base stations implemented via a communication device such as a smart phone.

In the above technical scheme, the implemented by a communication device includes: the setting location of the uplink channel detection sub-frame in the frame structure and the number of symbols occupied by the uplink channel detection sub-frame.

In the technical scheme, by setting the location of the uplink channel detection sub-frame in the frame structure and the number of symbols occupied according to the uplink channel detection sub-frame configuration command, it is possible to ensure that the uplink channel is effectively detected, so as to ensure that the uplink data is sent through the uplink sub-frame in the frame structure only when the uplink channel is idle, so as to avoid producing greater interference to other systems with an interference avoidance mechanism.

Figure 4:
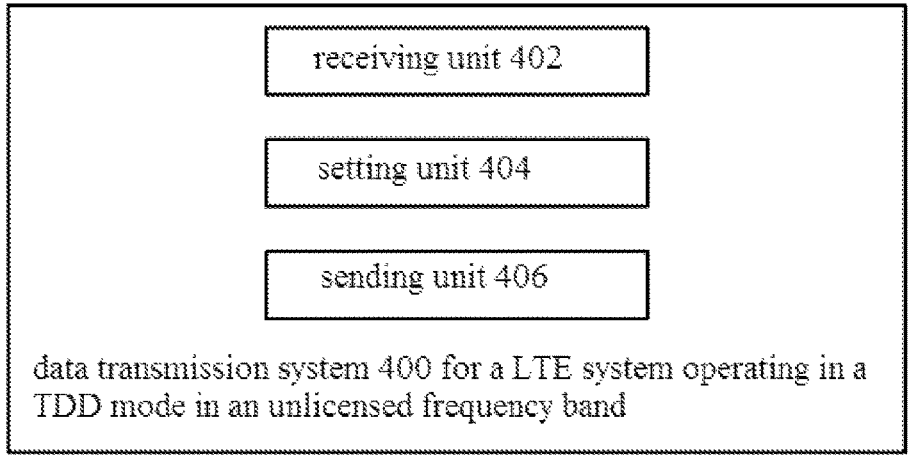
FIG. 4 is a structure diagram illustrating a data transmission system of a LTE system operating in a TDD mode in an unlicensed frequency band according to an implementation of the present disclosure.

FIG. 4 is a structure diagram illustrating a data transmission system of a LTE system operating in a TDD mode in an unlicensed frequency band according to an implementation of the present disclosure.

As illustrated in FIG. 4, a data transmission system 400 of a LTE system operating in a TDD mode in an unlicensed frequency band according to an implementation of the present disclosure includes the follows. A receiving unit 402, configured to receive an uplink channel detection sub-frame configuration command from a device with base station function; a setting unit 404, configured to set according to the uplink channel detection sub-frame configuration command, in a frame structure of the TDD mode, an uplink channel detection sub-frame for periodically detecting whether an uplink channel of the unlicensed frequency band is idle; a sending unit 406, configured to send uplink data via an uplink sub-frame in any detection period of the frame structure if the uplink channel detection sub-frame detects that the uplink channel is idle in the any detection period.

As an implementation, the data transmission system 400 can include a hardware processor (not illustrated in the figure) to perform the above-mentioned components.

In the technical scheme, by setting, according to the uplink channel detection sub-frame configuration command received, an uplink channel detection sub-frame in a frame structure of the TDD mode so as to detect the status of an uplink channel; in this way, uplink data can be sent via an uplink sub-frame in the frame structure if the uplink channel detection sub-frame detects that the uplink channel is idle, on the other hand, if it is detected that the uplink channel is busy, no uplink data will be sent; therefore, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. "Data" includes normal interaction data and control signaling. "Device with base station function" includes base stations, microcell base stations implemented via a communication device such as a smart phone.

In the above technical scheme, the uplink channel detection sub-frame configuration command includes: the setting location of the uplink channel detection sub-frame in the frame structure and the number of symbols occupied by the uplink channel detection sub-frame.

In the technical scheme, by setting the location of the uplink channel detection sub-frame in the frame structure and the number of symbols occupied according to the uplink channel detection sub-frame configuration command, it is possible to ensure that the uplink channel is effectively detected, so as to ensure that the uplink data is sent through the uplink sub-frame in the frame structure only when the uplink channel is idle, so as to avoid producing greater interference to other systems with an interference avoidance mechanism.

Figure 5:
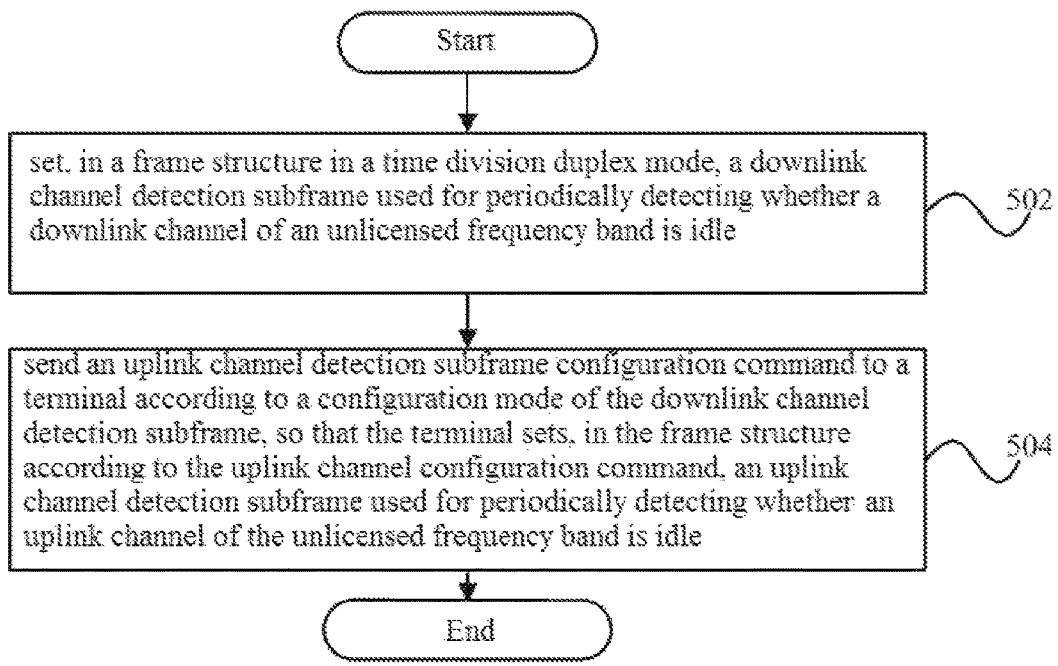
FIG. 5 is a flow chart diagram illustrating a control method for configuring a channel detection sub-frame according to an implementation of the present disclosure.

FIG. 5 is a flow chart diagram illustrating a control method for configuring a channel detection sub-frame according to an implementation of the present disclosure.

As illustrated in FIG. 5, the control method for configuring a channel detection sub-frame according to an implementation of the present disclosure includes the follows. Step 502, a downlink channel detection sub-frame for periodically detecting whether a downlink channel of an unlicensed frequency band is idle is set in a frame structure of a TDD mode; step 504, an uplink channel detection sub-frame configuration command is sent to the terminal according to the configuration mode of the downlink channel detection sub-frame, whereby the terminal can set according to the uplink channel detection sub-frame configuration command, in the frame structure, an uplink channel detection sub-frame for periodically detecting whether an uplink channel of the unlicensed frequency band is idle.

In this technical scheme, by setting, in the frame structure, the downlink channel detection sub-frame for periodically detecting whether the downlink channel of the unlicensed frequency band is idle, when it is detected by a device with base station function via the downlink channel detection sub-frame that the downlink channel is idle, the device with base station function can send data via the downlink sub-frame, and no data will be sent if it is detected that the downlink channel is busy; by sending the uplink channel detection sub-frame configuration command to the terminal, the terminal can set, in the frame structure of the TDD mode, according to the uplink channel detection sub-frame configuration command, the uplink channel detection sub-frame to detect the state of the uplink channel, so as to send uplink data via the uplink sub-frame of the frame structure if the uplink channel detection sub-frame detects that the uplink channel is idle, and no uplink data will be sent if it is detected that the uplink channel is busy. Therefore, by means of technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. "Data" includes normal interaction data and control signaling. "Device with base station function" includes base stations, microcell base stations implemented via a communication device such as a smart phone.

In the above mentioned technical scheme, the downlink channel detection sub-frame is set in at least one sub-frame of the frame structure, and the uplink channel detection sub-frame contained in the uplink channel detection sub-frame configuration command is located in the same sub-frame as the downlink channel detection sub-frame.

In this technical scheme, by arranging the uplink channel detection sub-frame in at least one sub-frame of the frame structure of the TDD mode and in the same sub-frame as the downlink channel detection sub-frame, in the frame structure of the TDD mode, there is no need to provide another sub-frame to carry a channel detection sub-frame, and it is possible to avoid that the uplink/downlink channel detection sub-frame occupies too many sub-frames; besides, the uplink/downlink channel detection sub-frame can be provided in one or more sub-frames of the frame structure of the TDD mode according to the actual situation of the LTE system, and the setting location of the uplink/downlink channel detection sub-frame can be one or more locations in an uplink sub-frame, a downlink sub-frame, or a special sub-frame.

The following lists several settings modes of the uplink/downlink channel detection sub-frame.

Setting Mode 1

In the above-mentioned technical scheme, the downlink channel detection sub-frame is set at the front end of a downlink sub-frame adjacent to an uplink sub-frame and a special sub-frame, and the setting location of the uplink channel detection sub-frame contained in the uplink channel detection sub-frame configuration command is at the rear end of the downlink channel.

In this technical scheme, by setting the downlink channel detection sub-frame at the front end of the downlink sub-frame adjacent to the uplink sub-frame and the special sub-frame and setting the uplink channel detection sub-frame to be located at the rear end of the downlink sub-frame, it is possible to achieve the detection of an uplink (downlink) channel before uplink (downlink) transmission of the uplink (downlink) sub-frame, and then it is possible to determine whether data can be sent via the uplink (downlink) sub-frame; the timeliness of channel detection can be ensured; it can also ensure that the channel state detected before uplink (downlink) data transmission is the latest state; it is possible to avoid that the uplink (downlink) data transmission being affected by a already changed channel state when it is needed to send uplink (downlink) data, where change of the channel state is caused by earlier channel detection and later uplink (downlink) data transmission; meanwhile, since the uplink (downlink) channel detection sub-frame does not occupy the uplink sub-frame, therefore, it is possible to ensure that the uplink sub-frame is completely used for uplink data transmission and to realize the full utilization of the uplink sub-frame; besides, a guard period needs to be set when a downlink sub-frame is converted to an uplink sub-frame, and when detecting the uplink channel, the uplink channel detection sub-frame is equivalent to a downlink signal, therefore, by setting the uplink channel detection sub-frame at the rear end of the downlink channel detection sub-frame, it is possible to avoid setting an additional guard period within the downlink sub-frame, and it is also possible to ensure that the remaining time between the downlink channel detection sub-frame and the uplink channel detection sub-frame can still be used to send downlink data.

In the above-mentioned technical scheme, if the downlink channel detection sub-frame occupies a first number of symbols and the uplink channel detection sub-frame contained in the uplink channel detection sub-frame configuration command occupies a second number of symbols, the sum of the first number and the second number is in the range of 2 to 14.

In this technical scheme, since each sub-frame of each frame structure has 14 symbols, and each uplink (downlink) channel detection sub-frame occupies at least one symbol respectively, therefore, the number of symbols occupied by the uplink (downlink) channel detection sub-frame is in the range of 2 to 14.

Setting Mode 2

In the above-mentioned technical scheme, the downlink channel detection sub-frame is set in a target downlink sub-frame that is immediately adjacent to other downlink sub-frames and a special sub-frame, and a guard period is set at the front end of the target downlink sub-frame, such that the downlink channel detection sub-frame is immediately adjacent to the guard period, and the setting location of the uplink channel detection sub-frame contained in the uplink channel detection sub-frame configuration command is at the rear end of the target downlink sub-frame.

In this technical scheme, a guard period needs to be set when the downlink sub-frame is converted to an uplink sub-frame, and when detecting the downlink channel, the downlink channel detection sub-frame is equivalent to an uplink signal, therefore, if the downlink channel detection sub-frame is set at the front end of the downlink sub-frame, a guard period will need to be set at the most front end of the downlink sub-frame; by setting the downlink channel detection sub-frame in the target downlink sub-frame immediately adjacent to the other downlink sub-frames and the special sub-frame, and setting the uplink channel detection sub-frame at the rear end of the target downlink sub-frame, it is possible to achieve the detection of an uplink (downlink) channel before uplink (downlink) transmission of the uplink (downlink) sub-frame, and then it is possible to determine whether data transmission can be performed via the uplink (downlink) sub-frame; the timeliness of channel detection can be ensured; it can also ensure that the channel state detected before uplink (downlink) data transmission is the latest state; it is possible to avoid that the uplink (downlink) data transmission being affected by a already changed channel state when it is needed to send uplink (downlink) data, where change of the channel state is caused by earlier channel detection and later uplink data transmission; meanwhile, since the uplink (downlink) channel detection sub-frame does not occupy the uplink sub-frame, therefore, it is possible to ensure that the uplink sub-frame is completely used for uplink data transmission and to realize the full utilization of the uplink sub-frame.

In the above-mentioned technical scheme, if the downlink channel detection sub-frame occupies a third number of symbols and the uplink channel detection sub-frame contained in the uplink channel detection sub-frame configuration command occupies a fourth number of symbols, the sum of the third number and the fourth number is in the range of 2 to 13.

In this technical scheme, since each sub-frame of each frame structure has 14 symbols, each uplink (downlink) channel detection sub-frame occupies at least one symbol respectively, and the guard period occupies at least one symbol, therefore, the sum of the number of symbols occupied by the uplink (downlink) channel detection sub-frame is in the range of 2 to 14.

Setting Mode 3

In the above-mentioned technical scheme, the downlink channel detection sub-frame is set in an uplink sub-frame adjacent to a downlink sub-frame, and the setting location of the uplink channel detection sub-frame contained in the uplink channel detection sub-frame configuration command is at the rear end of the uplink sub-frame, so as to immediately adjacent to the downlink channel detection sub-frame.

In this technical scheme, by setting the downlink channel detection sub-frame to be in the uplink sub-frame adjacent to the downlink sub-frame and setting the uplink channel detection sub-frame to be at the rear end of the uplink sub-frame, it is possible to perform measurements on the uplink (downlink) channel in time when uplink (downlink) transmission is required, and it is possible to avoid setting an additional guard period; meanwhile, since the uplink (downlink) channel detection sub-frame does not occupy any downlink sub-frame, it is possible to ensure that the downlink sub-frame is completely used for downlink data transmission, and the utilization of the downlink sub-frame is realized.

In the above-mentioned technical scheme, if the downlink channel detection sub-frame occupies a fifth number of symbols and the uplink channel detection sub-frame contained in the uplink channel detection sub-frame configuration command occupies a sixth number of symbols, the sum of the fifth number and the sixth number is in the range of 2 to 14.

Setting Mode 4

In the above-mentioned technical scheme, the downlink channel detection sub-frame is set in the special sub-frame and immediately adjacent to an uplink pilot time slot, and the setting location of the uplink channel detection sub-frame contained in the uplink channel detection sub-frame configuration command is a location immediately adjacent to a downlink pilot time slot.

In this technical scheme, by setting the downlink channel detection sub-frame in the special sub-frame, setting the downlink channel detection sub-frame to immediately adjacent to the uplink pilot time slot, and setting the uplink channel detection sub-frame to immediately adjacent to the downlink pilot time slot, so that there is no need to occupy the downlink sub-frame and the uplink sub-frame, and there is no need to set an additional protection time, and thus can ensure that the uplink transmission and downlink transmission of the system is not affected; meanwhile, if different base stations of the same operator set the channel detection sub-frame on the special sub-frame on the same carrier frequency as well as at the same location of the frame structure, then in the measurement of channel state, different base stations are based on a base station of other operators as a reference, and will not judge that the channel is busy even if a base station signal of the same operator is detected.

In the above-mentioned technical scheme, if the downlink channel detection sub-frame occupies a seventh number of symbols and the uplink channel detection sub-frame contained in the uplink channel detection sub-frame configuration command occupies an eighth number of symbols, the sum of the seventh number and the eighth number is in the range of 2 to 9.

In this technical scheme, since each sub-frame of each frame structure has 14 symbols, and each uplink (downlink) channel detection sub-frame occupies at least one symbol respectively, the uplink pilot time slot occupies at least one symbol, the downlink pilot time slot occupies at least three symbols, and the guard period occupies at least one symbol, therefore, the number of symbols occupied by the uplink (downlink) channel detection sub-frame is in the range of 2 to 9.

In the above mentioned technical scheme, in the operation of the LTE system, the number of symbols occupied by the uplink channel detection sub-frame and the downlink channel detection sub-frame is fixed; or in the operation of the LTE system, the rate of change of the channel condition of the other system using the unlicensed frequency band around the LTE system is detected in real time, and the number of symbols occupied by the downlink channel detection sub-frame and/or the number of symbols occupied by the uplink channel detection sub-frame is set dynamically according to the rate of change of the channel condition of the other system detected in real time and the channel detection capability of the device with base station function and/or the terminal.

In this technical scheme, in order to judge whether the uplink (downlink) channel is busy timely and accurately, the number of symbols occupied by the uplink (downlink) channel detection sub-frame can be fixed or can be dynamically changed, that is, the device with base station function can dynamically set the number of symbols occupied by the channel detection sub-frame according to the rate of change of the channel condition of the other systems and the channel detection capacity of the device with base station function and/or the terminal, whereby the device with base station function and/or the terminal can judge whether the uplink (downlink) channel is busy fully and accurately according to the uplink (downlink) channel detection sub-frame, and send uplink (downlink) data in time if it is detected that the uplink (downlink) channel is idle.

In the above-mentioned technical scheme, the rate of change of the channel condition of the other systems is proportional to the number of symbols occupied by the downlink channel detection sub-frame and the uplink channel detection sub-frame; the channel detection capacity of the device with base station function and the channel detection capacity of the terminal is inversely proportional to the number of symbols occupied by the downlink channel detection sub-frame and the number of symbols occupied by the uplink channel detection sub-frame respectively.

In this technical scheme, when dynamically adjust the number of symbols occupied by the uplink (downlink) channel detection sub-frame according to the actual situation, in order to be able to accurately measure the state of the uplink (downlink) channel, if the channel conditions of the other systems around the LTE system using the unlicensed band are changed faster, it is necessary to measure the state of the uplink (downlink) channel for several times, that is, the number of symbols occupied by the uplink (downlink) channel detection sub-frame is set to be large; if the channel detection capacity of the terminal is poor, it is also necessary to measure the state of the uplink channel for several times, that is, the number of symbols occupied by the uplink channel detection sub-frame is set to be large; similarly, if the channel detection capacity of the device with base station function is poor, it is also necessary to measure the state of the downlink channel for several times, that is, the number of symbols occupied by the downlink channel detection sub-frame is set to be large. Therefore, the rate of change of the channel condition of the other systems is proportional to the number of symbols occupied by the uplink (downlink) channel detection sub-frame, the channel detection capacity of the terminal is inversely proportional to the number of symbols occupied by the uplink channel detection sub-frame, and the channel detection capacity of the device with base station function is inversely proportional to the number of symbols occupied by the downlink channel detection sub-frame.

Figure 6:
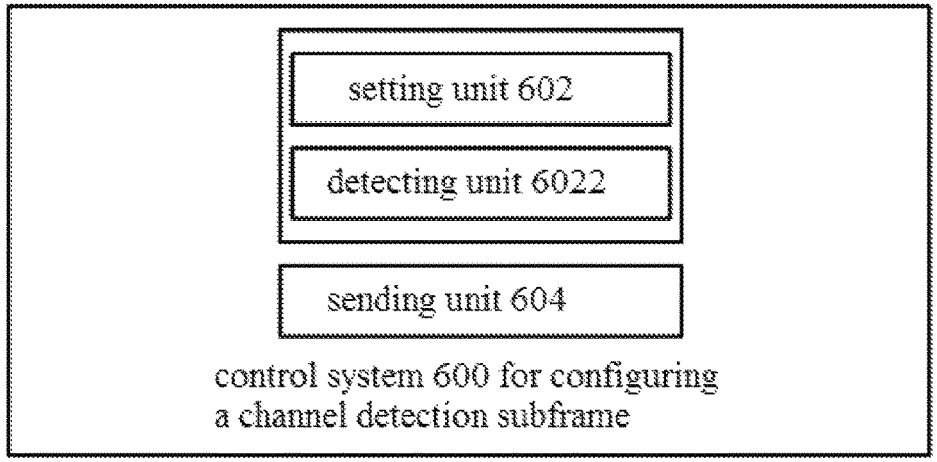
FIG. 6 is a structure diagram illustrating a control system for configuring a channel detection sub-frame according to an implementation of the present disclosure.

FIG. 6 is a structure diagram illustrating a control system for configuring a channel detection sub-frame according to an implementation of the present disclosure.

As illustrated in FIG. 6, a control system 600 for configuring a channel detection sub-frame according to an implementation of the present disclosure includes the follows. A setting unit 602, configured to set, in a frame structure of a TDD mode, a downlink channel detection sub-frame for periodically detecting whether a downlink channel of an unlicensed frequency band is idle; a sending unit 604, configured to send an uplink channel detection sub-frame configuration command to the terminal according to the configuration mode of the downlink channel detection sub-frame, whereby the terminal can set according to the uplink channel detection sub-frame configuration command, in the frame structure, an uplink channel detection sub-frame for periodically detecting whether an uplink channel of the unlicensed frequency band is idle.

As an implementation, the control system 600 can include a hardware processor (not illustrated in the figure) to perform the above-mentioned components.

In this technical scheme, by setting in the frame structure the downlink channel detection sub-frame for periodically detecting whether the downlink channel of the unlicensed frequency band is idle, when it is detected by a device with base station via the downlink channel detection sub-frame that the downlink channel is idle, the device with base station function can send downlink data via the downlink sub-frame, and no downlink data will be sent if it is detected that the downlink channel is busy; by sending the uplink channel detection sub-frame configuration command to the terminal, the terminal can set in the frame structure of the TDD mode, according to the uplink channel detection sub-frame configuration command, the uplink channel detection sub-frame to detect the state of the uplink channel, so as to send uplink data via the uplink sub-frame of the frame structure if the uplink channel detection sub-frame detects that the uplink channel is idle, and no uplink data will be sent if it is detected that the uplink channel is busy. Therefore, by means of technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. "Data" includes normal interaction data and control signaling. "Device with base station function" includes base stations, microcell base stations implemented via a communication device such as a smart phone.

In the above-mentioned technical scheme, the setting unit 602 is further configured to set the downlink channel detection sub-frame in at least one sub-frame of the frame structure, and the uplink channel detection sub-frame contained in the uplink channel detection sub-frame configuration command is set to be located in the same sub-frame as the downlink channel detection sub-frame.

In this technical scheme, by setting the uplink channel detection sub-frame to be in at least one sub-frame of the frame structure of the TDD mode and in the same sub-frame as the downlink channel detection sub-frame, in the frame structure of the TDD mode, there is no need to provide another sub-frame to carry a channel detection sub-frame, and it is possible to avoid that the uplink/downlink channel detection sub-frame occupies too many sub-frames; besides, the uplink/downlink channel detection sub-frame can be set in one or more sub-frames of the frame structure of the TDD mode according to the actual situation of the LTE system, and the setting location of the uplink/downlink channel detection sub-frame can be one or more locations in an uplink sub-frame, a downlink sub-frame, or a special sub-frame.

Setting Mode 1

In the above-mentioned technical scheme, the setting unit 602 is further configured to: set the downlink channel detection sub-frame to be at the front end of a downlink sub-frame adjacent to an uplink sub-frame and a special sub-frame, and set the setting location of the uplink channel detection sub-frame contained in the uplink channel detection sub-frame configuration command to be at the rear end of the downlink channel.

In this technical scheme, by setting the downlink channel detection sub-frame to be at the front end of the downlink sub-frame adjacent to the uplink sub-frame and the special sub-frame and setting the uplink channel detection sub-frame to be located at the rear end of the downlink sub-frame, it is possible to achieve the detection of an uplink (downlink) channel before uplink (downlink) transmission of the uplink (downlink) sub-frame, and then it is possible to determine whether data transmission can be performed via the uplink (downlink) sub-frame; the timeliness of channel detection can be ensured; it can also ensure that the channel state detected before uplink (downlink) data transmission is the latest state; it is possible to avoid that the uplink (downlink) data transmission being affected by a already changed channel state when it is needed to send uplink (downlink) data, where change of the channel state is caused by earlier channel detection and later uplink (downlink) data transmission; meanwhile, since the uplink (downlink) channel detection sub-frame does not occupy the uplink sub-frame, therefore, it is possible to ensure that the uplink sub-frame is completely used for uplink data transmission and to realize the full utilization of the uplink sub-frame; besides, a guard period needs to be set when a downlink sub-frame is converted to an uplink sub-frame, and when detecting the uplink channel, the uplink channel detection sub-frame is equivalent to a downlink signal, therefore, by setting the uplink channel detection sub-frame to be at the rear end of the downlink channel detection sub-frame, it is possible to avoid setting an additional guard period within the downlink sub-frame, and it is also possible to ensure that the remaining time between the downlink channel detection sub-frame and the uplink channel detection sub-frame can still be used to send downlink data.

In the above-mentioned technical scheme, if the downlink channel detection sub-frame occupies a first number of symbols and the uplink channel detection sub-frame contained in the uplink channel detection sub-frame configuration command occupies a second number of symbols, the sum of the first number and the second number is in the range of 2 to 14.

In this technical scheme, since each sub-frame of each frame structure has 14 symbols, and each uplink (downlink) channel detection sub-frame occupies at least one symbol respectively, therefore, the sum of the number of symbols occupied by the uplink (downlink) channel detection sub-frame is in the range of 2 to 14.

Setting Mode 2

In the above-mentioned technical scheme, the setting unit 602 is further configured to: set the downlink channel detection sub-frame to be in a target downlink sub-frame that is immediately adjacent to other downlink sub-frames and a special sub-frame, and set a guard period at the front end of the target downlink sub-frame, such that the downlink channel detection sub-frame is immediately adjacent to the guard period, and the setting location of the uplink channel detection sub-frame contained in the uplink channel detection sub-frame configuration command is at the rear end of the target downlink sub-frame.

In this technical scheme, a guard period needs to be set when the downlink sub-frame is converted to an uplink sub-frame, and when detecting the downlink channel, the downlink channel detection sub-frame is equivalent to an uplink signal, therefore, if the downlink channel detection sub-frame is set to be at the front end of the downlink sub-frame, a guard period will need to be set at the most front end of the downlink sub-frame; by setting the downlink channel detection sub-frame in the target downlink sub-frame immediately adjacent to the other downlink sub-frames and the special sub-frame, and setting the uplink channel detection sub-frame to be at the rear end of the target downlink sub-frame, it is possible to achieve the detection of an uplink (downlink) channel before uplink (downlink) transmission of the uplink (downlink) sub-frame, and then it is possible to determine whether data can be sent via the uplink (downlink) sub-frame; the timeliness of channel detection can be ensured; it can also ensure that the channel state detected before uplink (downlink) data transmission is the latest state; it is possible to avoid that the uplink (downlink) data transmission being affected by a already changed channel state when it is needed to send uplink (downlink) data, where change of the channel state is caused by earlier channel detection and later uplink (downlink) data transmission; meanwhile, since the uplink (downlink) channel detection sub-frame does not occupy the uplink sub-frame, and therefore, it is possible to ensure that the uplink sub-frame is completely used for uplink data transmission and to realize the full utilization of the uplink sub-frame.

In the above-mentioned technical scheme, if the downlink channel detection sub-frame occupies a third number of symbols and the uplink channel detection sub-frame contained in the uplink channel detection sub-frame configuration command occupies a fourth number of symbols, the sum of the third number and the fourth number is in the range of 2 to 13.

In this technical scheme, since each sub-frame of each frame structure has 14 symbols, each uplink (downlink) channel detection sub-frame occupies at least one symbol respectively, and the guard period occupies at least one symbol, therefore, the number of symbols occupied by the uplink (downlink) channel detection sub-frame is in the range of 2 to 14.

Setting Mode 3

In the above-mentioned technical scheme, the setting unit 602 is further configured to: set the downlink channel detection sub-frame to be in an uplink sub-frame adjacent to a downlink sub-frame, and the setting location of the uplink channel detection sub-frame contained in the uplink channel detection sub-frame configuration command is at the rear end of the uplink sub-frame, so as to immediately adjacent to the downlink channel detection sub-frame.

In this technical scheme, by setting the downlink channel detection sub-frame to be in the uplink sub-frame adjacent to the downlink sub-frame and setting the uplink channel detection sub-frame to be at the rear end of the uplink sub-frame, it is possible to perform measurements on the uplink (downlink) channel in time when uplink (downlink) transmission is required, and it is possible to avoid setting an additional guard period; meanwhile, since the uplink (downlink) channel detection sub-frame does not occupy any downlink sub-frame, it is possible to ensure that the downlink sub-frame is completely used for downlink data transmission, and the utilization of the downlink sub-frame is realized.

In the above-mentioned technical scheme, if the downlink channel detection sub-frame occupies a fifth number of symbols and the uplink channel detection sub-frame contained in the uplink channel detection sub-frame configuration command occupies a sixth number of symbols, the sum of the fifth number and the sixth number is in the range of 2 to 14.

Setting Mode 4

In the above-mentioned technical scheme, the setting unit 602 is further configured to: set the downlink channel detection sub-frame to be in the special sub-frame and immediately adjacent to an uplink pilot time slot, and the setting location of the uplink channel detection sub-frame contained in the uplink channel detection sub-frame configuration command is a location immediately adjacent to a downlink pilot time slot.

In this technical scheme, by setting the downlink channel detection sub-frame to be in the special sub-frame, setting the downlink channel detection sub-frame to immediately adjacent to the uplink pilot time slot, and setting the uplink channel detection sub-frame to immediately adjacent to the downlink pilot time slot, so that there is no need to occupy the downlink sub-frame and the uplink sub-frame, and there is no need to set an additional protection time, and thus can ensure that the uplink transmission and downlink transmission of the system is not affected; meanwhile, if different base stations of the same operator set the channel detection sub-frame on the special sub-frame on the same carrier frequency as well as at the same location of the frame structure, then when measuring the channel state, different base stations are based on a base station of other operators as a reference, and will not judge that the channel is busy even if a base station signal of the same operator is detected.

In the above-mentioned technical scheme, if the downlink channel detection sub-frame occupies a seventh number of symbols and the uplink channel detection sub-frame contained in the uplink channel detection sub-frame configuration command occupies an eighth number of symbols, the sum of the seventh number and the eighth number is in the range of 2 to 9.

In this technical scheme, since each sub-frame of each frame structure has 14 symbols, and each uplink (downlink) channel detection sub-frame occupies at least one symbol respectively, the uplink pilot time slot occupies at least one symbol, the downlink pilot time slot occupies at least three symbols, and the guard period occupies at least one symbol, therefore, the sum of the number of symbols occupied by the uplink (downlink) channel detection sub-frame is in the range of 2 to 9.

In the above mentioned technical scheme, in the operation of the LTE system, the number of symbols occupied by the uplink channel detection sub-frame and the downlink channel detection sub-frame is fixed; or the setting unit 602 includes: a detecting unit 6022, configured to detect, in the operation of the LET system, the rate of change of the channel condition of the other systems using the unlicensed frequency band around the LTE system in real time; the setting unit 602 is further configured to dynamically set the number of symbols occupied by the downlink channel detection sub-frame and/or the number of symbols occupied by the uplink channel detection sub-frame according to the rate of change of the channel condition of the other systems detected in real time and the channel detection capability of the device with base station function and/or the terminal.

In this technical scheme, in order to judge whether the uplink (downlink) channel is busy timely and accurately, the number of symbols occupied by the uplink (downlink) channel detection sub-frame can be fixed or can be dynamically changed, that is, the device with base station function can dynamically set the number of symbols occupied by the channel detection sub-frame according to the rate of change of the channel condition of the other systems and the channel detection capacity of the device with base station function and/or the terminal, whereby the device with base station function and/or the terminal can judge whether the uplink (downlink) channel is busy fully and accurately according to the uplink (downlink) channel detection sub-frame, and send uplink (downlink) data in time if it is detected that the uplink (downlink) channel is idle.

In the above-mentioned technical scheme, the rate of change of the channel condition of the other systems is proportional to the number of symbols occupied by the downlink channel detection sub-frame and the uplink channel detection sub-frame; the channel detection capacity of the device with base station function and the channel detection capacity of the terminal is inversely proportional to the number of symbols occupied by the downlink channel detection sub-frame and the number of symbols occupied by the uplink channel detection sub-frame respectively.

In this technical scheme, when dynamically adjust the number of symbols occupied by the uplink (downlink) channel detection sub-frame according to the actual situation, in order to be able to accurately measure the state of the uplink (downlink) channel, if the channel condition of other systems around the LTE system using the unlicensed band is changed faster, it is necessary to measure the state of the uplink (downlink) channel for several times, that is, the number of symbols occupied by the uplink (downlink) channel detection sub-frame is set to be large; if the channel detection capacity of the terminal is poor, it is also necessary to measure the state of the uplink channel for several times, that is, the number of symbols occupied by the uplink channel detection sub-frame is set to be large. Similarly, if the channel detection capacity of the device with base station function is poor, it is also necessary to measure the state of the downlink channel for several times, that is, the number of symbols occupied by the downlink channel detection sub-frame is set to be large. Therefore, the rate of change of the channel condition of the other systems is proportional to the number of symbols occupied by the uplink (downlink) channel detection sub-frame, the channel detection capacity of the terminal is inversely proportional to the number of symbols occupied by the uplink channel detection sub-frame, and the channel detection capacity of the device with base station function is inversely proportional to the number of symbols occupied by the downlink channel detection sub-frame.

Figure 7:
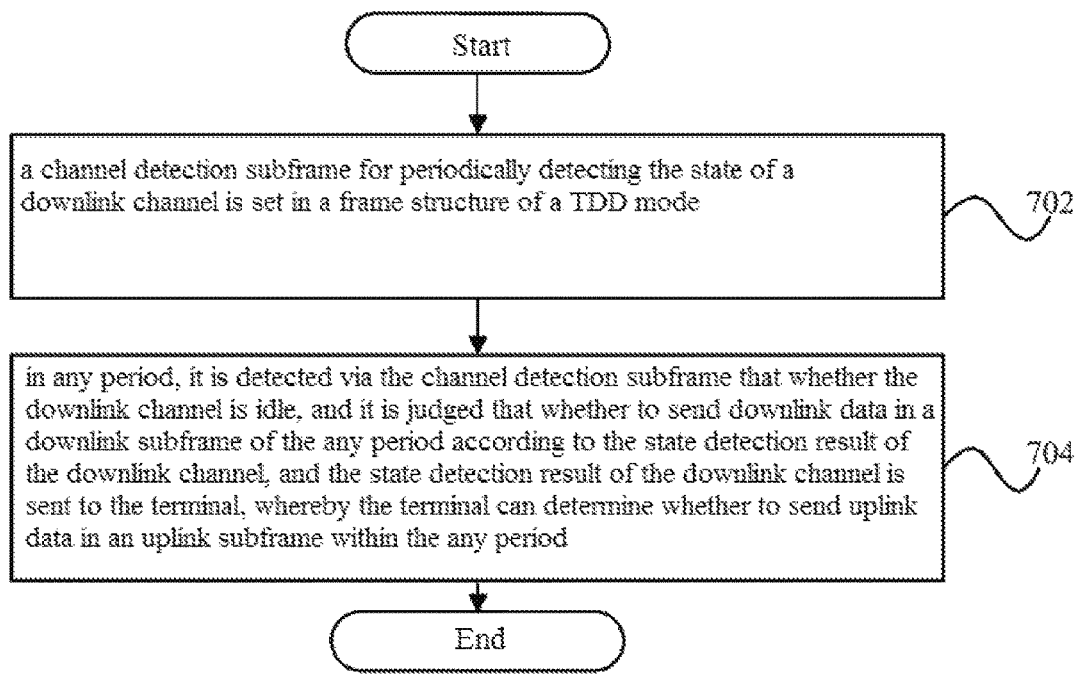
FIG. 7 is a flow chart diagram illustrating a data transmission method of a LTE system operating in a TDD mode in an unlicensed frequency band according to another implementation of the present disclosure.

FIG. 7 is a flow chart diagram illustrating a data transmission method of a LTE system operating in a TDD mode in an unlicensed frequency band according to another implementation of the present disclosure.

As illustrated in FIG. 7, the data transmission method of a LTE system operating in a TDD mode in an unlicensed frequency band according to another implementation of the present disclosure includes the follows. Step 702, a channel detection sub-frame for periodically detecting the state of a downlink channel is set in a frame structure of a TDD mode; step 704, in any period, it is detected via the channel detection sub-frame that whether the downlink channel is idle, and it is judged that whether to send downlink data in a downlink sub-frame of the any period according to the state detection result of the downlink channel, and the state detection result of the downlink channel is sent to the terminal, whereby the terminal can determine whether to send uplink data in an uplink sub-frame within the any period.

In this technical scheme, by setting in the frame structure the channel detection sub-frame for periodically detecting whether the downlink channel of the unlicensed frequency band is idle, when it is detected by a device with base station function via the channel detection sub-frame that the downlink channel is idle, the device with base station function can send data via the downlink sub-frame, and no data will be sent if it is detected that the downlink channel is busy; by sending the state detection result of the downlink channel to the terminal, the terminal can send uplink data via the uplink sub-frame in the frame structure if the state detection result of the downlink channel is idle, and no uplink data will be sent if the state detection result of the downlink channel is busy. Therefore, by means of technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. Meanwhile, by determining whether to send uplink data according to the state detection result of the downlink channel, it is possible to avoid setting an uplink channel detection sub-frame in the frame structure. "Data" includes normal interaction data and control signaling. "Device with base station function" includes base stations, microcell base stations implemented via a communication device such as a smart phone.

Figure 8:
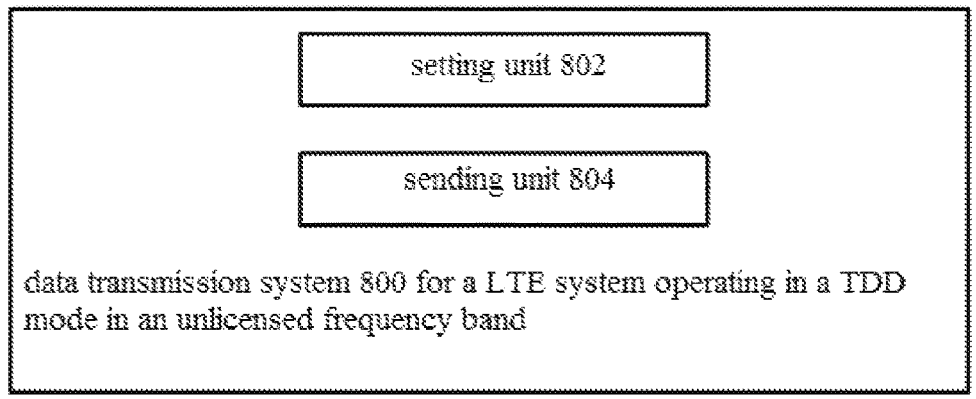
FIG. 8 is a structure diagram illustrating a data transmission system of a LTE system operating in a TDD mode in an unlicensed frequency band according to another implementation of the present disclosure.

FIG. 8 is a structure diagram illustrating a data transmission system of a LTE system operating in a TDD mode in an unlicensed frequency band according to another implementation of the present disclosure.

As illustrated in FIG. 8, a data transmission system 800 for a LTE system operating in a time division duplex mode in an unlicensed frequency band includes the follows. A setting unit 802, configured to set a channel detection sub-frame for periodically detecting the state of a downlink channel in a frame structure of a TDD mode; a sending unit 804, configured to determine in any period, after the channel detection sub-frame detects whether the downlink channel is idle, whether to send downlink data in a downlink sub-frame of the any period according to a state detection result of the downlink channel, and send the state detection result of the downlink channel to the terminal, whereby the terminal can determine whether to send uplink data on the uplink sub-frame within the any period.

As an implementation, the data transmission system 800 can include a hardware processor (not illustrated in the figure) to perform the above-mentioned components.

In this technical scheme, by setting in a frame structure a channel detection sub-frame for periodically detecting whether a downlink channel of an unlicensed frequency band is idle, a device with base station function can send downlink data via a downlink sub-frame if it is detected via the channel detection sub-frame that the downlink channel is idle, and no downlink data will be sent if it is detected that the downlink channel is busy; by sending the state detection result of the downlink channel to the terminal, the terminal can send uplink data via an uplink sub-frame of the frame structure if the state detection result for the downlink channel is idle, and no uplink data will be sent if the state detection result of the downlink channel is busy. Therefore, by means of technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band. Meanwhile, by determining by the terminal whether to send uplink data according to the state detection result of the downlink channel, it is possible to avoid setting an uplink channel detection sub-frame in the frame structure. "Data" includes normal interaction data and control signaling. "Device with base station function" includes base stations, microcell base stations implemented via a communication device such as a smart phone.

Figure 9A:
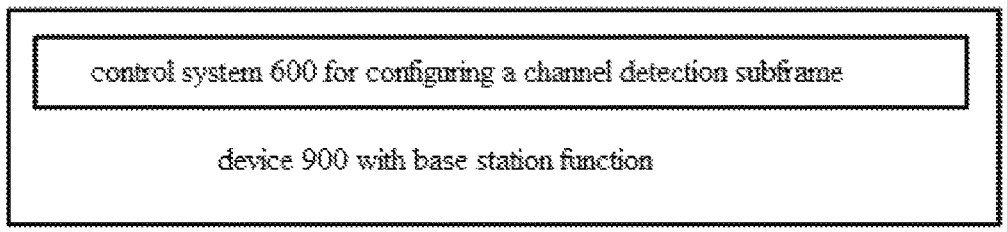
FIG. 9A is a structure diagram illustrating a device with base station function according to an implementation of the present disclosure.

FIG. 9A is a structure diagram illustrating a device with base station function according to an implementation of the present disclosure.

As illustrated in FIG. 9A, the device with base station function according to an implementation of the present disclosure includes the above-mentioned control system 600 for configuring a channel detection sub-frame.

In this technical scheme, by providing the device with base station function with the control system for configuring a channel detection sub-frame, a corresponding interference avoidance mechanism can be adopted when the LTE system operates in a TDD mode in an unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band.

Figure 9B:
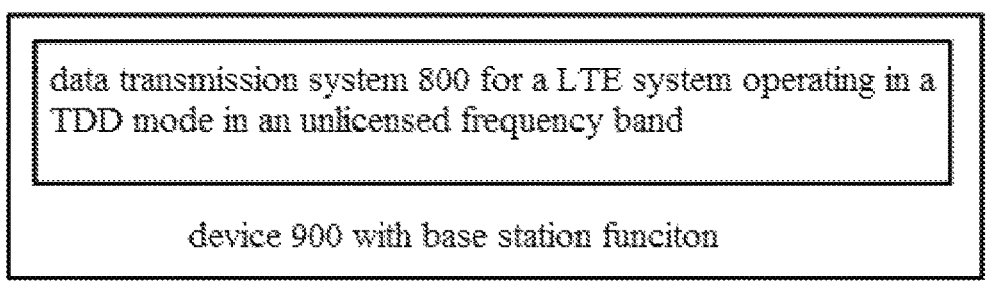
FIG. 9B is a structure diagram illustrating a device with base station function according to another implementation of the present disclosure.

FIG. 9B is a structure diagram illustrating a device with base station function according to another implementation of the present disclosure.

As illustrated in FIG. 9B, the device with base station function according to another implementation of the present disclosure includes the above-mentioned data transmission system 800 of a LTE system operating in a TDD mode in an unlicensed frequency band.

In this technical scheme, by providing the device with base station function with the data transmission system of a LTE system operating in a TDD mode in an unlicensed frequency band, a corresponding interference avoidance mechanism can be adopted when the LTE system operates in a TDD mode in an unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band.

Figure 10:
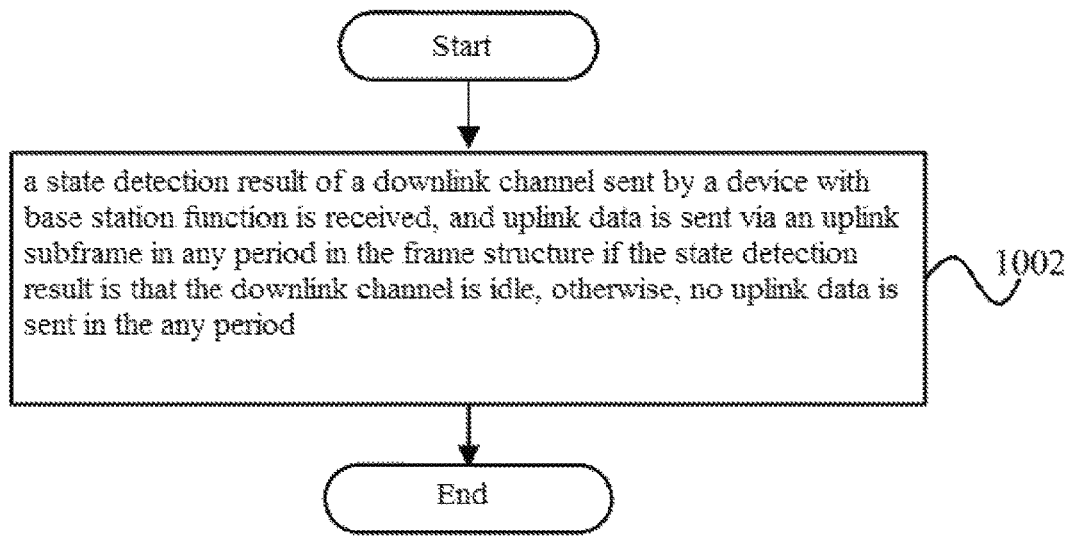
FIG. 10 is a flow chart diagram illustrating a data transmission method of a LTE system operating in a TDD mode in an unlicensed frequency band according to a further implementation of the present disclosure.

FIG. 10 is a flow chart diagram illustrating a data transmission method of a LTE system operating in a TDD mode in an unlicensed frequency band according to a further implementation of the present disclosure.

As illustrated in FIG. 10, the data transmission method of a LTE system operating in a TDD mode in an unlicensed frequency band according to a further implementation of the present disclosure includes the follows. Step 1002, a state detection result of a downlink channel sent by a device with base station function is received, and uplink data is sent via an uplink sub-frame in any period in the frame structure if the state detection result is that the downlink channel is idle, otherwise, no uplink data is sent in the any period.

In this technical scheme, by receiving the state detection result of the downlink channel from a base station, the terminal can sent uplink data via the uplink sub-frame in the frame structure if the state detection result of the downlink channel is idle, and no uplink data is sent if the state detection result of the downlink channel is busy; therefore, by means of the technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band; meanwhile, the terminal can determine whether to send uplink data according to the state detection result of the downlink channel, such that it can avoid setting an uplink channel detection sub-frame in the frame structure.

Figure 11:
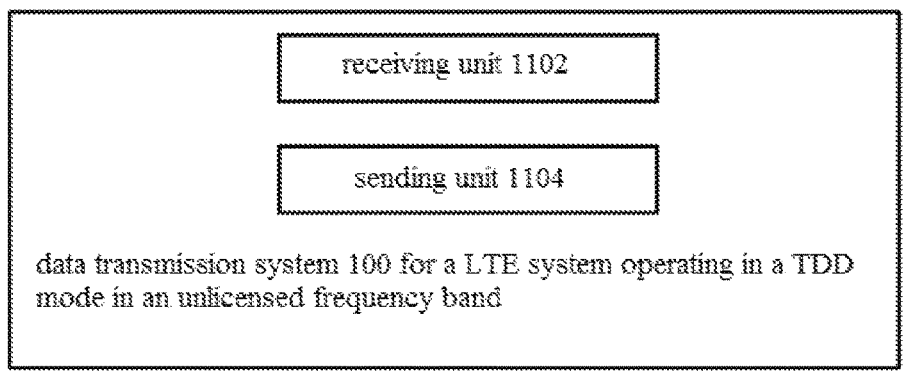
FIG. 11 is a structure diagram illustrating a data transmission system of a LTE system operating in a TDD mode in an unlicensed frequency band according to a further implementation of the present disclosure.

FIG. 11 is a structure diagram illustrating a data transmission system of a LTE system operating in a TDD mode in an unlicensed frequency band according to a further implementation of the present disclosure.

As illustrated in FIG. 11, a data transmission system 1100 of a LTE system operating in a TDD mode in an unlicensed frequency band according to a further implementation of the present disclosure includes the follows. A receiving unit 1102, configured to receive a state detection result of a downlink channel sent by a device with base station function; and a sending unit 1104, configured to send uplink data via an uplink sub-frame in any period in the frame structure if the state detection result is that the downlink channel is idle, otherwise, do not send the uplink data in the any period.

As an implementation, the data transmission system 1100 can include a hardware processor (not illustrated in the figure) to perform the above-mentioned components.

In this technical scheme, by receiving the state detection result of the downlink channel from a base station, the terminal can sent uplink data via the uplink sub-frame in the frame structure if the state detection result of the downlink channel is idle, and no uplink data is sent if the state detection result of the downlink channel is busy; therefore, by means of the technical schemes of the present disclosure, a corresponding interference avoidance mechanism can be adopted when the LTE system operates in the TDD mode in the unlicensed frequency band, and peaceful coexistence of the LTE system and other systems (such as Wi-Fi system) operating in the unlicensed frequency band can be achieved, so as to prevent the LTE system operating in the unlicensed frequency band from causing great interference to other systems due to lack of the interference avoidance mechanism while ensuring normal operation of the LTE system in the unlicensed frequency band; meanwhile, the terminal can determine whether to send uplink data according to the state detection result of the downlink channel, such that it can avoid setting an uplink channel detection sub-frame in the frame structure.

The technical schemes of the present disclosure will be described in detail with reference to FIG. 12 to FIG. 16.

The technical scheme of the present disclosure mainly relates to an interference avoidance mechanism used when a LTE system operating in a TDD mode in an unlicensed frequency band.

First, the frame structure of the TDD mode will be introduced.

Figure 12:
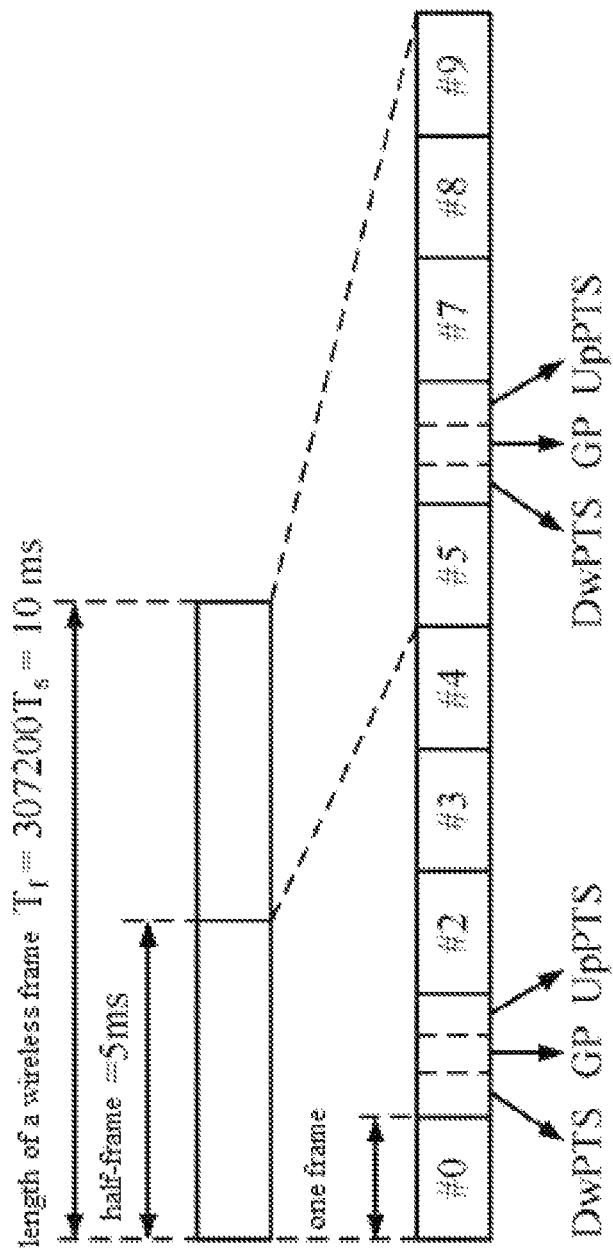
FIG. 12 is a schematic diagram illustrating a TDD frame structure of 5 ms of uplink to downlink switch.

FIG. 12 illustrates a TDD frame structure of 5 ms of downlink-to-uplink switch. For the TDD frame structure of 5 ms of downlink-to-uplink switch, 1 frame includes 8 normal sub-frames and 2 special sub-frames. The configuration mode (that is, configured for uplink transmission or downlink transmission) of the 8 normal sub-frames can refer to Table 1. For a TDD frame structure of 10 ms of downlink-to-uplink switch, 1 frame includes 9 normal sub-frames and 1 special sub-frame, and the configuration mode (that is, configured for uplink transmission or downlink transmission) of the 9 normal sub-frames can also refer to Table 1. Among which each normal sub-frame in turn includes 14 symbols.

TABLE 1

| Uplink-downlink configuration | Downlink-to-Uplink Switch-point | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The setting location of the uplink/downlink LBT sub-frame (that is, uplink/downlink channel detection sub-frame) may be various, and four setting modes are listed below.

Setting Mode 1

An uplink LBT detection time and a downlink LBT detection time are both arranged in a D (downlink) sub-frame. For the LBT detection of a downlink channel, it is desirable that the D sub-frame is preceded by a U (Uplink) sub-frame; for the LBT detection of an uplink channel, it is desirable that the D sub-frame is followed by a U (Uplink) sub-frame, of course, there is a S (Special) sub-frame between the D sub-frame and the U sub-frame.

Sub-frame #0 and sub-frame #5 of Uplink-downlink configuration #0, and sub-frame #5 of Uplink-downlink configuration #6 can satisfy the above condition. Specifically, please refer to the frame structure locations illustrated in shaded in Table 2.

TABLE 2

| Uplink-downlink config-uration | Downlink-to-Uplink Switch-point | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

If in one frame structure there are two locations that can be used to set the uplink/downlink LBT detection sub-frame, this is the case where the repetition periods of the uplink LBT detection sub-frame and the downlink LBT detections sub-frame are both 5 ms. If the repetition periods of the uplink LBT detection sub-frame and the downlink LBT detections sub-frame are both 10 ms or more, the front one among the available locations will be selected to place the uplink/downlink LBT detection sub-frame.

Furthermore, a downlink LBT time for detecting the idle state of the downlink channel is placed at the first few symbols of the D sub-frame, and an uplink LBT time for detecting the idle state of the uplink channel is placed at the last few symbols of the D sub-frame. The sum of the length of the uplink LBT detection time and the downlink LBT detection time can be N1 symbols, where N1=2, 3 . . . 14. The value of N1 can be configured statically or semi-statically depending on actual situations.

Figure 13A:
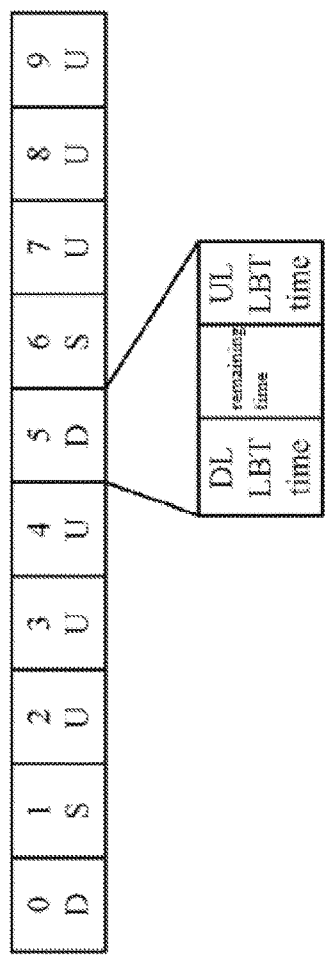
FIG. 13A is a structure diagram illustrating an uplink (downlink) channel detection sub-frame set in a downlink sub-frame according to an implementation of the present disclosure.

Other than the two LBT detection time, the middle is the remaining time of the D sub-frame. Symbols of the remaining time of the D sub-frame can continue to be used for any downlink transmission. Specifically, as illustrated in FIG. 13A, a structure diagram of a D sub-frame for LBT detection is illustrated by taking TDD configuration mode #0 as an example, in which the uplink/downlink LBT sub-frame is set in sub-frame #5 (that is, D sub-frame), the uplink LBT sub-frame is located at the rear end of sub-frame #5 and the downlink LBT sub-frame is at the front end of sub-frame #5.

Setting Mode 2

An uplink LBT detection time and a downlink LBT detection time are both arranged in a D (downlink) sub-frame. The D sub-frame is followed by a S sub-frame and is preceded by a U sub-frame, please refer to the frame structure locations illustrated in shaded in Table 3.

TABLE 3

| Uplink-downlink config-uration | Downlink-to-Uplink Switch-point | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |

TABLE 3-continued

| Uplink-downlink config-uration | Downlink-to-Uplink Switch-point | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

If in one frame structure there are two locations that can be used to set the uplink/downlink LBT detection sub-frame, this is the case where the repetition periods of the uplink LBT detection sub-frame and the downlink LBT detections sub-frame are both 5 ms. If the repetition periods of the uplink LBT detection sub-frame and the downlink LBT detections sub-frame are both 10 ms or more, the front one among the available locations will be selected to place the uplink/downlink LBT detection sub-frame.

Furthermore, a downlink LBT time for detecting the idle state of the downlink channel (downlink channel detection sub-frame) is placed at the rear end immediately after a guard period Gap and occupies several symbols, and an uplink LBT time for detecting the idle state of the uplink channel (uplink channel detection sub-frame) is placed at the last several symbols of the D sub-frame. The sum of the length of the uplink LBT detection time and the downlink LBT detection time can be N2 symbols, where N2=2, 3 . . . 13. The value of N2 can be configured statically or semi-statically depending on actual situations.

Figure 13B:
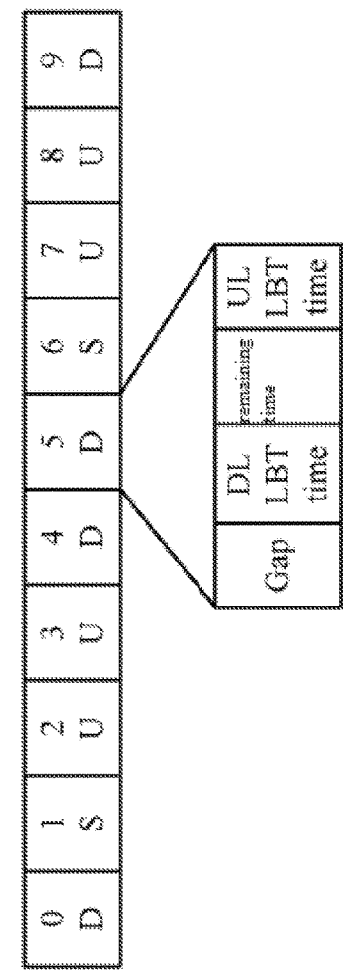
FIG. 13B is a structure diagram illustrating an uplink (downlink) channel detection sub-frame set in a downlink sub-frame according to another implementation of the present disclosure.

Specifically, FIG. 13B is a structure diagram where both the uplink LBT detection sub-frame and the downlink LBT detection sub-frame are located at a D sub-frame by taking TDD configuration mode #1 as an example; as illustrated in FIG. 13B, the uplink/downlink LBT sub-frame is set in sub-frame #5 (that is, D sub-frame), the uplink LBT detection sub-frame is located at the rear end of sub-frame #5 and the downlink LBT detection sub-frame is immediately adjacent to Gap.

Setting Mode 3

An uplink LBT detection time and a downlink LBT detection time are both arranged in a U (uplink) sub-frame. The U sub-frame is immediately followed by a D sub-frame, please refer to the frame structure locations illustrated in shaded in FIG. 4.

TABLE 4

| Uplink-downlink config-uration | Downlink-to-Uplink Switch-point | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

If in one frame structure there are two locations that can be used to set the uplink/downlink LBT detection sub-frame, this is the case where the repetition periods of the uplink LBT detection sub-frame and the downlink LBT detections sub-frame are both 5 ms. If the repetition periods of the uplink LBT detection sub-frame and the downlink LBT detections sub-frame are both 10 ms or more, the front one among the available locations will be selected to place the uplink/downlink LBT detection sub-frame.

Furthermore, an uplink LBT time for detecting the idle state of the uplink channel is placed at the end of the U sub-frame, and a downlink LBT time for detecting the idle state of the downlink channel is placed on the left of the uplink LBT time for detecting the idle state of the uplink channel. The sum of the length of the uplink LBT detection time and the downlink LBT detection time can be N3 symbols, where N3=2, 3 . . . 14. The value of N3 can be various and can be configured statically or semi-statically depending on actual situations, the uplink LBT detection time and the downlink LBT detection can be the same or different from each other.

Figures 14, 15:
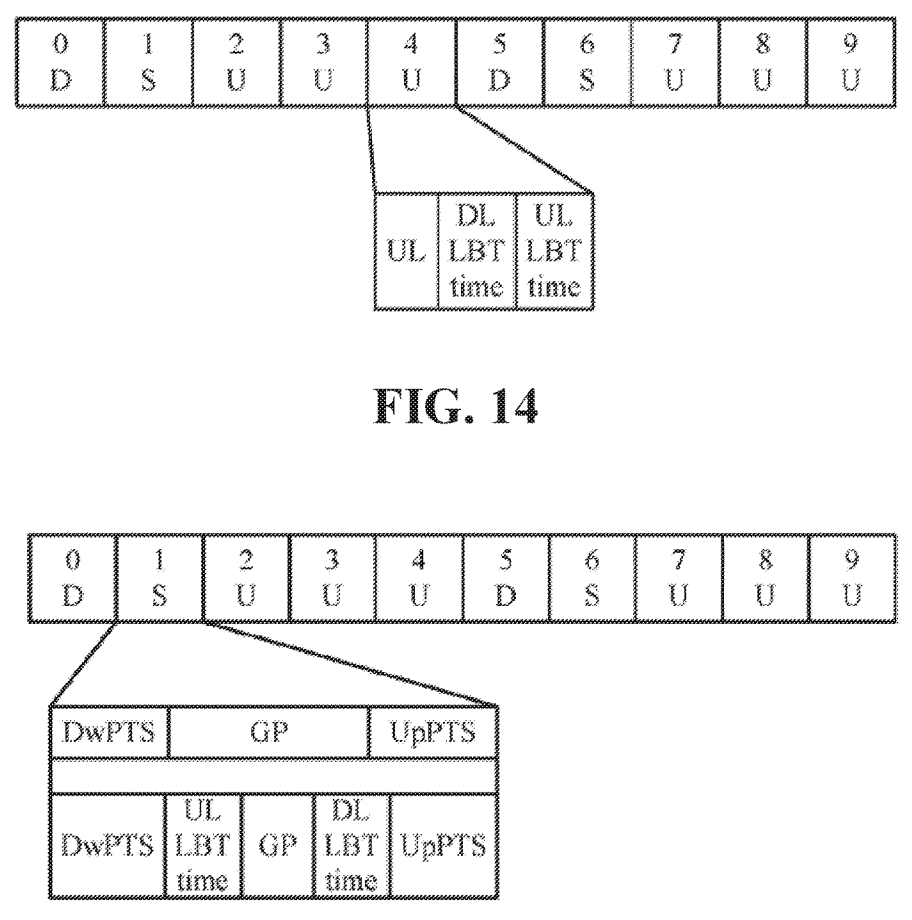

Other than the uplink/downlink LBT detection time, the foremost is the remaining time of the U sub-frame. Symbols of the remaining time can be used for any uplink transmission. FIG. 14 is a structure diagram illustrating a U sub-frame for LBT detection by taking TDD configuration mode #0 as an example. Assume that the repetition period is 10 ms.

Setting Mode 4

An uplink LBT detection time and a downlink LBT detection time are both placed at a S sub-frame, please refer to the frame structure locations illustrated in shaded in FIG. 5.

among the available locations will be selected to place the uplink/downlink LBT detection sub-frame.

Furthermore, the S sub-frame includes a Downlink Pilot Time Slot (DwPTS), an Uplink Pilot Time Slot (UpPTS), and a Guard Period (GP), the uplink LBT for detecting the idle state of the uplink channel is placed on the left of the GP and immediately adjacent to the DwPTS. The downlink LBT for detecting the idle state of the downlink channel is placed on the right of the GP and immediately adjacent to the UpPTS. FIG. 15 is a structure diagram illustrating a S sub-frame for uplink/downlink LBT detection by taking TDD configuration mode #0 as an example. Assume that the repetition period is 10 ms.

The following describes the time taken by the LBT time in the S sub-frame.

In Table 6, the length of the DwPTS and the UpPTS given in the 36.211 standard is illustrated. Other than the DwPTS and the UpPTS, the remaining time of 1 ms is the length of the GP. In order to place the uplink LBT time and the downlink LBT time in 1 ms, it is necessary to shorten the sum of the lengths of the DwPTS, UpPTS, and GP so that the sum of the time lengths thereof is less than 1 ms, and the remaining time of 1 ms can be used for the uplink LBT time and the downlink LBT time.

TABLE 6

| Special sub-frame configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · Ts | 2192 · Ts | 2560 · Ts | 7680 · Ts | 2192 · Ts | 2560 · Ts |
| 1 | 19760 · Ts | | | 20480 · Ts | | |
| 2 | 21952 · Ts | | | 23040 · Ts | | |
| 3 | 24144 · Ts | | | 25600 · Ts | | |
| 4 | 26336 · Ts | | | 7680 · Ts | | |
| 5 | 6592 · Ts | 4384 · Ts | 5120 · Ts | 20480 · Ts | 4384 · Ts | 5120 · Ts |
| 6 | 19760 · Ts | | | 23040 · Ts | | |
| 7 | 21952 · Ts | | | 12800 · Ts | | |
| 8 | 24144 · Ts | | | — | — | — |
| 9 | 13168 · Ts | | | — | — | — |

TABLE 5

| Uplink-downlink configuration | Downlink-to-Uplink Switch-point | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

If in one frame structure there are two locations that can be used to set the uplink/downlink LBT detection sub-frame, this is the case where the repetition periods of the uplink LBT detection sub-frame and the downlink LBT detections sub-frame are both 5 ms. If the repetition periods of the uplink LBT detection sub-frame and the downlink LBT detections sub-frame are both 10 ms or more, the front one Basically, the length of the UpPTS is fixed, either 1 symbol or 2 symbols, however, the length of the DwPTS or GP varies depending on the cell radius. In order to ensure the uplink and downlink LBT time, the DwPTS can only use a shorter configuration and GP can only use a shorter configuration. That is to say, in configurations of the DwPTS and UpPTS, the configuration in which the DwPTS and UpPTS occupy the sum of length of more than 11 symbols cannot be selected, this is because the GP occupies at least 1 symbol, the UpPTS occupies at least 1 symbol, and the DwPTS occupies at least 3 symbols, thus, the maximum length and the minimum length of the uplink/downlink LBT detection time for detecting the idle state of the uplink/downlink channel is 9 symbols and 2 symbols respectively. That is, the time length of the uplink/downlink LBT detection can be N4 symbols, where N4=2, 3 9 The value of N4 can be configured statically or semi-statically depending on actual situations.

In the above-mentioned four setting modes, only the setting mode 2 needs an additional guard period from the D sub-frame to the U sub-frame.

Second, due to the asymmetry of the uplink and downlink services, U sub-frames or D sub-frames can be used for LBT, which will partially change the uplink and downlink properties of U sub-frames or D sub-frames. When S sub-frames are used, no additional U sub-frames and D sub-frames will be occupied, but the disadvantage is that the value of the DwPTS or GP is limited.

Furthermore, when the U sub-frame is used for LBT, since the LBT sub-frame used for uplink/downlink configuration for each TDD is not synchronized, and if a neighbor cell uses a different TDD configuration, it is possible that cell #2 is in the uplink or downlink transmission while cell #1 is carrying out LBT, then cell #1 may detects that a channel is busy, however, the channel detected can be occupied by cell #1. That is to say, in the scene where the same operator of the same channel uses different TDD for uplink/downlink configuration, the setting mode 3 may not apply, unless a base station can distinguish signals from different operations or Wi-Fi. For the other setting modes, since various TDD uplink/downlink configurations use the same S sub-frame or D sub-frame for LBT, even if the neighbor cell use a different configuration, an external signal strength can still be detected because the setting locations of the uplink and downlink LBT time are the same, and the channel will not be judged as busy even if the signal strength of the neighbor cell is detected. The setting mode 1 has the same advantage, that is, neighbor cells with different TDD configurations can carry out LBT detection on the same sub-frame.

By means of the above-mentioned technical scheme for designing uplink/downlink LBT detection of the present disclosure, when the unlicensed frequency band is used, the LTE system can detect in advance whether the channel is used by any Wi-Fi device or other systems, and if yes, the LTE system will not occupy the channel, so that peaceful coexistence of the LTE system and existing access technologies such as Wi-Fi in the unlicensed frequency band is achieved.

The technical solution of the present disclosure has been described in detail with reference to the accompanying drawings, by means of the technical solution, an LTE system operating in an unlicensed frequency band can be prevented from causing great interference to other systems while ensuring normal operation of the LTE system in the unlicensed frequency band, so that peaceful coexistence of the LTE system and other systems in the unlicensed frequency band is achieved.

According to an implementation of the present disclosure, there is provided a program product stored on a non-volatile machine-readable medium. The program product is used for data transmission for a LTE system operating in a TDD mode in an unlicensed frequency band, and includes machine-executable instructions for causing a computer system to perform the following steps. An uplink channel detection sub-frame configuration command from a device with base station function is received; a channel detection sub-frame for periodically detecting whether an uplink channel of the unlicensed frequency band is idle is set in a frame structure of the TDD mode according to the uplink channel detection sub-frame configuration command; in any detection period, if the channel detection sub-frame detects that the uplink channel is idle, uplink data is sent via an uplink sub-frame in the any detection period of the frame structure.

According to an implementation of the present disclosure, there is provided a nonvolatile machine readable medium storing a program product for a terminal, where the program product is used for data transmission for a LTE system operating in a TDD mode in an unlicensed frequency band, and includes machine-executable instructions for causing a computer system to perform the following steps. An uplink channel detection sub-frame configuration command from a device with base station function is received; a channel detection sub-frame for periodically detecting whether an uplink channel of the unlicensed frequency band is idle is set in a frame structure of the TDD mode according to the uplink channel detection sub-frame configuration command; in any detection period, if the channel detection sub-frame detects that the uplink channel is idle, uplink data is sent via an uplink sub-frame in the any detection period of the frame structure.

According to another aspect of the present disclosure, there is provided a machine readable program; the machine readable program can cause a machine to perform the data transmission method for a LTE system operating in a TDD mode in an unlicensed frequency band of any of the above-mentioned technical schemes.

According to an implementation of the present disclosure, there is provided a storage medium in which a machine-readable program is stored, where the machine-readable program can cause a machine to perform the data transmission method for a LTE system operating in a TDD mode in an unlicensed frequency band of any of the above-mentioned technical schemes.

According to an implementation of the present disclosure, it is also provided a program product stored on a nonvolatile machine-readable medium; the program product is used to control the configuration of a channel detection sub-frame and includes machine-executable instructions for causing a computer system to perform the following steps. A downlink channel detection sub-frame for periodically detecting whether a downlink channel of an unlicensed frequency band is idle is set in a frame structure of a TDD mode; an uplink channel detection sub-frame configuration command is sent to the terminal according to the configuration mode of the downlink channel detection sub-frame, whereby the terminal can set according to the uplink channel detection sub-frame configuration command, in the frame structure, an uplink channel detection sub-frame for periodically detecting whether an uplink channel of the unlicensed frequency band is idle.

According to an implementation of the present disclosure, there is provided a nonvolatile machine readable medium, in which a program product for controlling the configuration of a channel detection sub-frame for a device with base station function is stored. The program product includes machine executable instructions for causing a computer system to perform the following steps. A downlink channel detection sub-frame for periodically detecting whether a downlink channel of an unlicensed frequency band is idle is set in a frame structure of a TDD mode; an uplink channel detection sub-frame configuration command is sent to the terminal according to the configuration mode of the downlink channel detection sub-frame, whereby the terminal can set according to the uplink channel detection sub-frame configuration command, in the frame structure, an uplink channel detection sub-frame for periodically detecting whether an uplink channel of the unlicensed frequency band is idle.

According to an implementation of the present disclosure, there is provided a machine readable program; the machine readable program can cause a machine to perform the control method for configuring a channel detection sub-frame of any of the above-mentioned technical schemes.

According to an implementation of the present disclosure, there is provided a storage medium in which a machine-readable program is stored; the machine-readable program can cause a machine to perform the control method for configuring a channel detection sub-frame of any of the above-mentioned technical schemes.

According to an implementation of the present disclosure, there is provided a program product that is stored on a nonvolatile machine-readable medium; the program product is used for data transmission of a LTE system operating in a TDD mode in an unlicensed frequency band and includes machine-executable instructions for causing a computer system to perform the following steps. A channel detection sub-frame for periodically detecting the state of a downlink channel is set in a frame structure of a TDD mode; in any period, it is detected via the channel detection sub-frame that whether the downlink channel is idle, and it is judged that whether to send downlink data in a downlink sub-frame of the any period according to the state detection result of the downlink channel, and the state detection result of the downlink channel is sent to the terminal, whereby the terminal can determine whether to send uplink data in an uplink sub-frame within the any period.

According to an implementation of the present disclosure, there is provided a nonvolatile machine readable medium storing a program product for a terminal, where the program product is used for data transmission for a LTE system operating in a TDD mode in an unlicensed frequency band, and includes machine-executable instructions for causing a computer system to perform the following steps. A channel detection sub-frame for periodically detecting the state of a downlink channel is set in a frame structure of a TDD mode; in any period, it is detected via the channel detection sub-frame that whether the downlink channel is idle, and it is judged that whether to send downlink data in a downlink sub-frame of the any period according to the state detection result of the downlink channel, and the state detection result of the downlink channel is sent to the terminal, whereby the terminal can determine whether to send uplink data in an uplink sub-frame within the any period.

According to another aspect of the present disclosure, there is provided a machine readable program; the machine readable program can cause a machine to perform the data transmission method for a LTE system operating in a TDD mode in an unlicensed frequency band of any of the above-mentioned technical schemes.

According to an implementation of the present disclosure, there is provided a storage medium in which a machine-readable program is stored, where the machine-readable program can cause a machine to perform the data transmission method for a LTE system operating in a TDD mode in an unlicensed frequency band of any of the above-mentioned technical schemes.

According to an implementation of the present disclosure, there is provided a program product that is stored on a nonvolatile machine-readable medium; the program product is used for data transmission of a LTE system operating in a TDD mode in an unlicensed frequency band and includes machine-executable instructions for causing a computer system to perform the following steps. A state detection result of a downlink channel sent by a device with base station function is received, and uplink data is sent via an uplink sub-frame in any period in the frame structure if the state detection result is that the downlink channel is idle, otherwise, no uplink data is sent in the any period.

According to another aspect of the present disclosure, there is provided a machine readable program; the machine readable program can cause a machine to perform the data transmission method for a LTE system operating in a TDD mode in an unlicensed frequency band of any of the above-mentioned technical schemes.

According to an implementation of the present disclosure, there is provided a storage medium in which a machine-readable program is stored, where the machine-readable program can cause a machine to perform the data transmission method for a LTE system operating in a TDD mode in an unlicensed frequency band of any of the above-mentioned technical schemes.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for data transmission of a terminal for an LTE system operating in a time division duplex (TDD) mode in an unlicensed frequency band, comprising:

receiving an uplink channel detection sub-frame configuration command from a device with base station function;

according to the uplink channel detection sub-frame configuration command, in a frame structure of the TDD mode, setting an uplink channel detection sub-frame for periodically detecting whether an uplink channel of the unlicensed frequency band is idle, wherein the uplink channel detection sub-frame is set to be at least one of:

at a front end of a downlink sub-frame adjacent to an uplink sub-frame and a special sub-frame, and a setting location of the uplink channel detection sub-frame contained in the uplink channel detection sub-frame configuration command is at a rear end of the downlink sub-frame;

in a target downlink sub-frame that is immediately adjacent to another downlink sub-frames and a special sub-frame, and a guard period is set at a front end of the target downlink sub-frame, wherein the downlink channel detection sub-frame is immediately adjacent to the guard period, and a setting location of the uplink channel detection sub-frame contained in the uplink channel detection sub-frame configuration command is at a rear end of the target downlink sub-frame;

in an uplink sub-frame adjacent to a downlink sub-frame, and a setting location of the uplink channel detection sub-frame contained in the uplink channel detection sub-frame configuration command is at a rear end of the uplink sub-frame and immediately adjacent to the downlink channel detection sub-frame; or in a special sub-frame and immediately adjacent to an uplink pilot time slot, and a setting location of the uplink channel detection sub-frame contained in the uplink channel detection sub-frame configuration command is a location immediately adjacent to a downlink pilot time slot; and in a detection period, when the uplink channel detection sub-frame detects that the uplink channel is idle, sending uplink data via an uplink sub-frame in the detection period of the frame structure.

2. The method of claim 1, wherein the uplink channel detection sub-frame configuration command comprises: a setting location of the uplink channel detection sub-frame in the frame structure and the number of symbols occupied by the uplink channel detection sub-frame.

3. A system for data transmission of a terminal for an LTE system operating in a TDD mode in an unlicensed frequency band, comprising a hardware processor configured to:

receive an uplink channel detection sub-frame configuration command from a device with base station function;

according to the uplink channel detection sub-frame configuration command, in a frame structure of the TDD mode, set an uplink channel detection sub-frame for periodically detecting whether an uplink channel of the unlicensed frequency band is idle, wherein the uplink channel detection sub-frame is set to be at least one of:

at a front end of a downlink sub-frame adjacent to an uplink sub-frame and a special sub-frame, and a setting location of the uplink channel detection sub-frame contained in the uplink channel detection sub-frame configuration command is at a rear end of the downlink sub-frame;

in a target downlink sub-frame that is immediately adjacent to another downlink sub-frames and a special sub-frame, and a guard period is set at a front end of the target downlink sub-frame, wherein the downlink channel detection sub-frame is immediately adjacent to the guard period, and a setting location of the uplink channel detection sub-frame contained in the uplink channel detection sub-frame configuration command is at a rear end of the target downlink sub-frame;

in an uplink sub-frame adjacent to a downlink sub-frame, and a setting location of the uplink channel detection sub-frame contained in the uplink channel detection sub-frame configuration command is at a rear end of the uplink sub-frame and immediately adjacent to the downlink channel detection sub-frame; or in a special sub-frame and immediately adjacent to an uplink pilot time slot, and a setting location of the uplink channel detection sub-frame contained in the uplink channel detection sub-frame configuration command is a location immediately adjacent to a downlink pilot time slot; and send uplink data via an uplink sub-frame in a detection period of the frame structure when the uplink channel detection sub-frame detects that the uplink channel is idle in the detection period.

4. The system of claim 3, wherein the uplink channel detection sub-frame configuration command comprises: a setting location of the uplink channel detection sub-frame in the frame structure and the number of symbols occupied by the uplink channel detection sub-frame.

5. A method of configuring a channel detection sub-frame for a terminal and a device with base station function, comprising:

setting, in a frame structure of a TDD mode, a downlink channel detection sub-frame for periodically detecting whether a downlink channel of an unlicensed frequency band is idle; and sending an uplink channel detection sub-frame configuration command to the terminal according to a configuration mode of the downlink channel detection sub-frame, wherein according to the uplink channel detection sub-frame configuration command, in the frame structure, an uplink channel detection sub-frame is set for periodically detecting whether an uplink channel of the unlicensed frequency band is idle, wherein the downlink channel detection sub-frame is set to be at least one of:

at a front end of a downlink sub-frame adjacent to an uplink sub-frame and a special sub-frame, and a setting location of the uplink channel detection sub-frame contained in the uplink channel detection sub-frame configuration command is at a rear end of the downlink sub-frame;

in a target downlink sub-frame that is immediately adjacent to another downlink sub-frames and a special sub-frame, and a guard period is set at a front end of the target downlink sub-frame, wherein the downlink channel detection sub-frame is immediately adjacent to the guard period, and a setting location of the uplink channel detection sub-frame contained in the uplink channel detection sub-frame configuration command is at a rear end of the target downlink sub-frame;

in an uplink sub-frame adjacent to a downlink sub-frame, and a setting location of the uplink channel detection sub-frame contained in the uplink channel detection sub-frame configuration command is at a rear end of the uplink sub-frame and immediately adjacent to the downlink channel detection sub-frame; or in a special sub-frame and immediately adjacent to an uplink pilot time slot, and a setting location of the uplink channel detection sub-frame contained in the uplink channel detection sub-frame configuration command is a location immediately adjacent to a downlink pilot time slot.

6. The method of claim 5, wherein when the downlink channel detection sub-frame occupies a first number of symbols and the uplink channel detection sub-frame contained in the uplink channel detection sub-frame configuration command occupies a second number of symbols, a sum of the first number of symbols and the second number of symbols is in a range of 2 to 14.

7. The method of claim 6, wherein during control of the terminal by the device with base station function, the number of symbols occupied by the uplink channel detection sub-frame and the downlink channel detection sub-frame is fixed; or during the control of the terminal by the device with base station function, a rate of change of a channel condition of other systems using the unlicensed frequency band around an LTE system is detected in real time, and at least one of a number of symbols occupied by the downlink channel detection sub-frame or a number of symbols occupied by the uplink channel detection sub-frame is set dynamically according to the rate of change of the channel condition of the other systems detected in real time and a channel detection capability of at least one of the device with base station function or the terminal.

8. The method of claim 7, wherein the rate of change of the channel condition of the other systems is proportional to one of the number of symbols occupied by the downlink channel detection sub-frame or the number of symbols occupied the uplink channel detection sub-frame; and a channel detection capacity of the device with base station function and a channel detection capacity of the terminal is inversely proportional to the number of symbols occupied by the downlink channel detection sub-frame and the number of symbols occupied by the uplink channel detection sub-frame respectively.

9. The method of claim 5, wherein when the downlink channel detection sub-frame occupies a third number of symbols and the uplink channel detection sub-frame contained in the uplink channel detection sub-frame configuration command occupies a fourth number of symbols, a sum of the third number of symbols and the fourth number of symbols is in a range of 2 to 13.

10. The method of claim 9, wherein during control of the terminal by the device with base station function, the number of symbols occupied by the uplink channel detection sub-frame and the downlink channel detection sub-frame is fixed; or during the control of the terminal by the device with base station function, a rate of change of a channel condition of other systems using the unlicensed frequency band around an LTE system is detected in real time, and at least one of a number of symbols occupied by the downlink channel detection sub-frame or a number of symbols occupied by the uplink channel detection sub-frame is set dynamically according to the rate of change of the channel condition of the other systems detected in real time and channel detection capability of at least one of the device with base station function or the terminal.

11. The method of claim 5, wherein when the downlink channel detection sub-frame occupies a fifth number of symbols and the uplink channel detection sub-frame contained in the uplink channel detection sub-frame configuration command occupies a sixth number of symbols, a sum of the fifth number of symbols and the sixth number of symbols is in a range of 2 to 14.

12. The method of claim 11, wherein during control of the terminal by the device with base station function, the number of symbols occupied by the uplink channel detection sub-frame and the downlink channel detection sub-frame is fixed; or during the control of the terminal by the device with base station function, a rate of change of a channel condition of other systems using the unlicensed frequency band around an LTE system is detected in real time, and at least one of a number of symbols occupied by the downlink channel detection sub-frame or a number of symbols occupied by the uplink channel detection sub-frame is set dynamically according to the rate of change of the channel condition of the other systems detected in real time and channel detection capability of at least one of the device with base station function or the terminal.

13. The method of claim 5, wherein when the downlink channel detection sub-frame occupies a seventh number of symbols and the uplink channel detection sub-frame contained in the uplink channel detection sub-frame configuration command occupies an eighth number of symbols, a sum of the seventh number of symbols and the eighth number of symbols is in a range of 2 to 9.

14. The method of claim 13, wherein during control of the terminal by the device with base station function, the number of symbols occupied by the uplink channel detection sub-frame and the downlink channel detection sub-frame is fixed; or during the control of the terminal by the device with base station function, a rate of change of a channel condition of other systems using the unlicensed frequency band around an LTE system is detected in real time, and at least one of a number of symbols occupied by the downlink channel detection sub-frame or a number of symbols occupied by the uplink channel detection sub-frame is set dynamically according to the rate of change of the channel condition of the other systems detected in real time and channel detection capability of at least one of the device with base station function or the terminal.

15. The method of claim 5, wherein the downlink channel detection sub-frame is set in the frame structure of the TDD mode, and the uplink channel detection sub-frame contained in the uplink channel detection sub-frame configuration command is located in the same sub-frame as the downlink channel detection sub-frame.

* * * * *